(12) United States Patent
Park et al.

(10) Patent No.: US 11,599,778 B2
(45) Date of Patent: Mar. 7, 2023

(54) PROCESSOR IN MEMORY SUPPORTING BINARY CONVOLUTION OPERATION AND METHOD OF OPERATING THE SAME

(71) Applicant: Korea University Research and Business Foundation, Seoul (KR)

(72) Inventors: Jongsun Park, Seoul (KR); Woong Choi, Bucheon-si (KR); Kwanghyo Jeong, Seongnam-si (KR)

(73) Assignee: Korea University Research and Business Foundation, Seoul (KR)

(*) Notice: Subject to any disclaimer, the term of this patent is extended or adjusted under 35 U.S.C. 154(b) by 1080 days.

(21) Appl. No.: 16/253,332

(22) Filed: Jan. 22, 2019

(65) Prior Publication Data
US 2019/0244087 A1 Aug. 8, 2019

(30) Foreign Application Priority Data
Feb. 5, 2018 (KR) .................. 10-2018-0014121

(51) Int. Cl.
G06K 9/00 (2022.01)
G06N 3/063 (2023.01)
G06N 3/04 (2023.01)
G06K 9/62 (2022.01)

(52) U.S. Cl.
CPC ........... *G06N 3/063* (2013.01); *G06K 9/6267* (2013.01); *G06N 3/04* (2013.01)

(58) Field of Classification Search
CPC ........ G06N 3/063; G06N 3/04; G06N 3/0454; G06N 3/08; G06K 9/6267; G06V 10/82
See application file for complete search history.

(56) References Cited

U.S. PATENT DOCUMENTS 10,769,480 B2 * 9/2020 Li ........................... G06T 7/248
10,902,317 B2 * 1/2021 Hou ..................... G06N 3/0635
11,138,738 B2 * 10/2021 Li ............................. G06T 7/11
(Continued)

FOREIGN PATENT DOCUMENTS

KR 10-2017-0107205 A 9/2017
KR 10-2019-0070044 A 6/2019

OTHER PUBLICATIONS

Pagiamtzis, Kostas et al., "Content-Addressable Memory (CAM) Circuits and Architectures: A Tutorial and Survey", *IEEE Journal of Solid-State Circuits*, vol. 41, No. 3, Mar. 2006 (pp. 712-727).
(Continued)

*Primary Examiner* — Dhaval V Patel
(74) *Attorney, Agent, or Firm* — NSIP Law

(57) ABSTRACT

Disclosed are an artificial neural network device and a method of operating the same. The artificial neural network device includes an operation part performing an artificial neural network operation on an input feature map and a classification part performing a classifying operation on the input feature map based on the artificial neural network operation of the operation part. The operation part includes an XNOR operation circuit performing an XNOR operation on the input feature map and a filter and a binarizing circuit performing a binarization operation based on the result of the XNOR operation of the XNOR operation circuit. Accordingly, the artificial neural network device is miniaturized and performs the operation at high speed.

19 Claims, 26 Drawing Sheets

(56) References Cited

U.S. PATENT DOCUMENTS

| | | |
|---|---|---|
| 2016/0379109 A1 | 12/2016 | Chung et al. |
| 2017/0316312 A1 | 11/2017 | Goyal et al. |
| 2017/0323196 A1 | 11/2017 | Gibson et al. |
| 2018/0032844 A1* | 2/2018 | Yao ..................... G06V 10/20 |
| 2019/0122104 A1* | 4/2019 | Zhang ................. G06K 9/6267 |
| 2019/0392299 A1* | 12/2019 | Ma ..................... G06N 3/0635 |

OTHER PUBLICATIONS

Courbariaux, Matthieu, et al. "Binarized Neural Networks: Training Neural Networks with Weights and Activations Constrained to + 1 or -1," arXivpreprint arXiv: 1602.02830, 2016 (11 pages in English).
Korean Office Action dated Mar. 26, 2020 in corresponding Korean Patent Application No. 10-2018-0014121 (9 pages in Korean).
Rastegari et al., "XNOR-Net: ImageNet Classification Using Binary Convolutional Neural Networks," Aug. 2, 2016 (17 pages in English).

\* cited by examiner iFMAP ⊙ Filter = oFMAP iFMAP ⊙ Filter = oFMAP

PROCESSOR IN MEMORY SUPPORTING BINARY CONVOLUTION OPERATION AND METHOD OF OPERATING THE SAME

CROSS-REFERENCE TO RELATED APPLICATION

This U.S. non-provisional patent application claims priority under 35 U.S.C. § 119 of Korean Patent Application No. 10-2018-0014121 filed on Feb. 5, 2018, the contents of which are hereby incorporated by reference in its entirety.

BACKGROUND

1. Field of Disclosure

The present disclosure relates to a processor in memory and a method of operating the processor in memory.

2. Description of the Related Art

In recent years, artificial neural networks are one of the most prominent technologies. A convolutional neural network (hereinafter, referred to as "CNN"), which is a core computational model of deep learning technologies, is a kind of artificial neural networks in which each neuron is arranged in multiple layers to have characteristics similar to the response characteristics of an overlap region in a human visual system.

The CNN has an advantage of recognizing image and audio of a complex pattern with high recognition rate as the number of the layers increases. Accordingly, recently, an image and audio recognition rate that remains in stagnant state for a long time dramatically increases by the CNN technology, and CNN systems break the highest record of the image recognition rate in various image recognition benchmarking tests such as the ImageNet Challange. As a result, the CNN has been spotlighted in various machine learning fields such as image recognition, audio recognition, and language translation.

SUMMARY

The present disclosure provides a processor in memory capable of being miniaturized and performing operations quickly.

The present disclosure provides a method of operating the processor in memory.

Embodiments of the inventive concept provide a processor in memory including a time domain signal processor and a content addressable memory. The processor in memory performs a binary convolution operation and a majority voting operation on an input feature map through the time domain signal processor and the content addressable memory to output an output feature map.

The content addressable memory corresponds to a memory cell array of an artificial neural network device, and the time domain signal processor corresponds to a binarizing circuit of the artificial neural network device.

Embodiments of the inventive concept provide an artificial neural network device including an operation part performing an artificial neural network operation on an input feature map and a classification part performing a classifying operation on the input feature map based on the artificial neural network operation of the operation part. The operation part includes an XNOR operation circuit performing an XNOR operation on the input feature map and a filter and a binarizing circuit performing a binarization operation based on the result of the XNOR operation of the XNOR operation circuit.

The XNOR operation circuit includes a memory cell array including a plurality of memory cells connected to a plurality of match lines and storing data of the input feature map and a precharge circuit precharging at least one match line among the match lines.

The memory cell array is connected to a plurality of source lines and receives weight data of the filter through the source lines.

At least one memory cell among the memory cells includes a first transistor connected to a match line selected from the match lines and turned on or off in response to a complementary value of stored data, a second transistor connected to the selected match line and turned on or off in response to the stored data, a third transistor connected to the first transistor and turned on or off in response to data provided to a source line selected from the source lines, and a fourth transistor connected to the second transistor and turned on or off in response to a complementary value of the data provided to the selected source line.

When the stored data and the data provided through the selected source line are the same as each other, the at least one memory cell blocks a discharge path with respect to the selected match line, and when the stored data and the data provided through the selected source line are different from each other, the at least one memory cell generates the discharge path with respect to the selected match line.

The memory cell array further includes a plurality of reference cells connected to a reference match line to generate or block a discharge path with respect to the reference match line.

At least one reference cell among the reference cells includes a first transistor connected to the reference match line to block the discharge path, a second transistor connected to the reference match line and turned on or off in response to a weight value of the filter, a third transistor connected to the first transistor and turned on or off in response to data provided to a source line selected from the source lines, and a fourth transistor connected to the second transistor and turned on or off in response to a complementary value of the data provided to the selected source line.

When the artificial neural network operation is performed, some reference cells of the reference cells generate the discharge path with respect to the reference match line, and other reference cells of the reference cells block the discharge path with respect to the reference match line.

The reference cells do not store data.

The binarizing circuit includes a plurality of TDAs and a delay buffer disposed between the match lines and the TDAs, and each of the TDAs is connected to a corresponding match line among the match lines and commonly connected to the reference match line.

At least one TDA among the TDAs outputs data of an output feature map based on a comparison result of a discharge rate of the corresponding match line among the match lines and a discharge rate of the reference match line.

The memory cells include a first group of memory cells corresponding to a first match line among the match lines and a second group of memory cells corresponding to a second match line different from the first match line among the match lines, and the data of the input feature map are stored in the first group of memory cells and the second group of memory cells to overlap with each other.

The artificial neural network operation with respect to the data stored in the first group and the artificial neural network operation with respect to the data stored in the second group are substantially simultaneously performed.

The memory cells include a first group of memory cells corresponding to a first match line among the match lines and a second group of memory cells corresponding to a second match line different from the first match line among the match lines, and the data of the input feature map are stored in the first group of memory cells and the second group of memory cells not to overlap with each other.

The memory cell array includes a plurality of banks storing the memory cells and a match line switch circuit disposed between the banks.

The match line switch circuit selects a match line of a first bank among the banks based on a sliding operation of the filter, selects a match line of a second bank adjacent to the first bank, and electrically connects the selected match line of the first bank to the selected match line of the second bank.

Embodiments of the inventive concept provide a method of operating an artificial neural network device including programming data of an input feature map in a memory cell array, precharging at least one match line among a plurality of match lines connected to the memory cell array, providing weight data of a filter through at least one source line among a plurality of source lines connected to the memory cell array, and performing an evaluation operation on the at least one match line based on the data stored in the memory cell array and the weight data of the filter.

The method further includes outputting data of an output feature map based on a comparison result of a discharge rate of the at least one match line and a discharge rate of a reference match line.

The evaluation operation with respect to a first match line among the match lines and the evaluation operation with respect to a second match line different from the first match line are substantially simultaneously performed.

The data of input feature map are stored in the memory cell array to overlap with each other.

According to the above, the processor in memory may be miniaturized and may perform the operation at high speed.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Hereinafter, the technological thought of the present disclosure will be described with reference to accompanying drawings in order to explain in sufficient detail such that the technological thought of the present disclosure is easily carried out by an ordinary skilled person in the art within the spirit and scope of the present disclosure.

Figure 1:
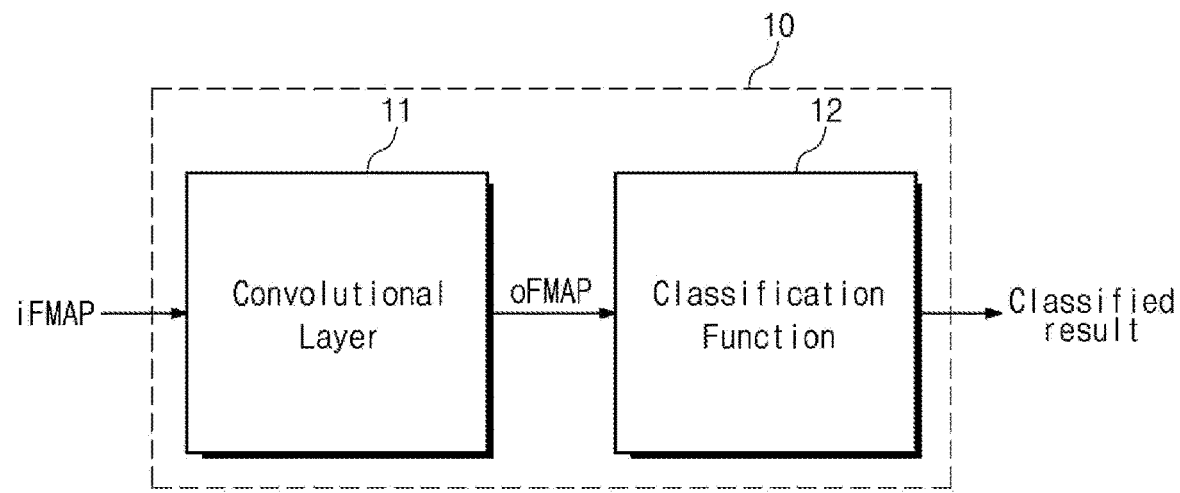
FIG. 1 is a block diagram showing a convolutional neural network (CNN) device according to an exemplary embodiment of the present disclosure.

FIG. 1 is a block diagram showing a convolutional neural network (hereinafter, referred to as "CNN") device 10 according to an exemplary embodiment of the present disclosure. FIG. 1 shows the CNN device 10 as an example of an artificial neural network device. Referring to FIG. 1, the CNN device 10 includes a convolutional layer 11 and a classification function 12.

The convolutional layer 11 performs an operation that extracts features from data input thereto. For example, the convolutional layer 11 may receive an input feature map iFMAP from an outside and may extract the features from the input feature map iFMAP to output an output feature map oFMAP. In this case, the input feature map iFMAP may be an image, but the input feature map iFMAP should not be limited to the image. For instance, the input feature map iFMAP may be a variety of data, such as an image, an audio, and a language.

The convolutional layer 11 may include a filter extracting the features and an activation function converting a value of the filter to a non-linear value. In addition, the convolutional layer 11 may further include configurations that perform well-known operations such as pooling and max pooling.

The classification function 12 receives the output feature map oFMAP from the convolutional layer 11 and performs an operation that classifies the output feature map oFMAP. The classification function 12 may include, for example, a fully-connected layer, a softmax function, and a dropout layer.

Figure 2:
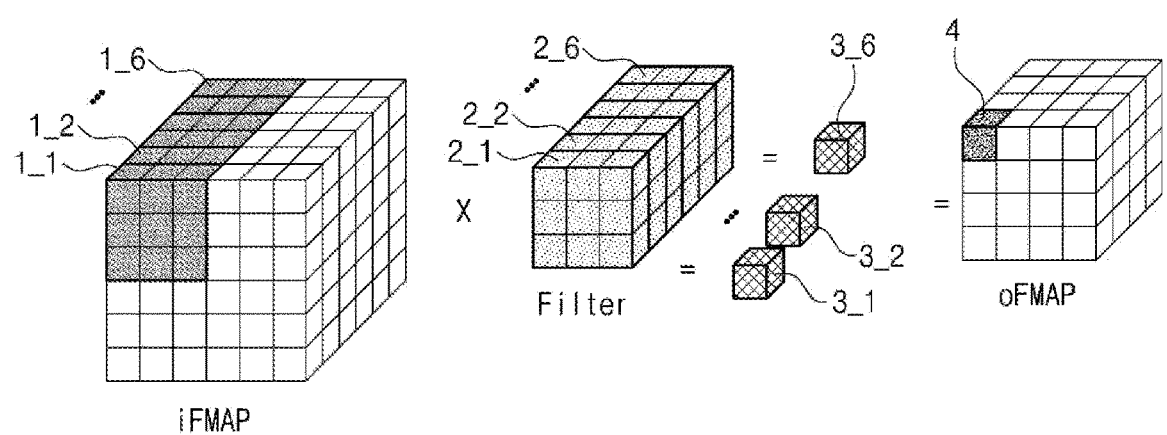
FIG. 2 is a conceptual view showing a CNN operation of the CNN device of FIG. 1.

FIG. 2 is a conceptual view showing a CNN operation of the convolutional layer 11 of the CNN device 10 of FIG. 1. For the convenience of explanation, FIG. 2 shows an example of a process of calculating one data 4 among the data of the output feature map oFMAP.

The CNN operation of the convolutional layer 11 may be defined by multiplication and addition of the filter and the input feature map iFMAP. In other words, the CNN operation of the convolutional layer 11 may be defined by a partial sum (pSUM) defined by a multiplication of the input feature map iFMAP and the filter and the output feature map oFMAP defined by an addition of the partial sums (pSUMs).

As an example, as shown in FIG. 2, when assuming that a depth of a channel of the filter is "6", a first partial sum 3_1 may be defined by the multiplication of a first part 2_1 of the filter and a part 1_1 of the input feature map iFMAP corresponding to the first part 2_1 of the filter. In addition, a second partial sum 3_2 may be defined by the multiplication of a second part 2_2 of the filter and a part 1_2 of the input feature map iFMAP corresponding to the second part 2_2 of the filter. Similarly, a sixth partial sum 3_6 may be defined by the multiplication of a sixth part 2_6 of the filter and a part 1_6 of the input feature map iFMAP corresponding to the sixth part 2_6 of the filter. The output feature map 4 may be defined by the addition of the first to sixth partial sums 3_1 to 3_6.

As described above, a process of calculating the partial sums and a process of accumulating and calculating corresponding partial sums are performed to calculate the one data 4 among the data of the output feature map oFMAP. Accordingly, as the channel increases, the number of operations increases. Further, in order to perform CNN operation, an additional memory is needed to store data corresponding to the partial sums in addition to a memory to store data corresponding to the input feature map and a memory to store data corresponding to the filter. Accordingly, a large amount of memory is required, and thus it is disadvantageous in miniaturization and integration.

Figure 3:
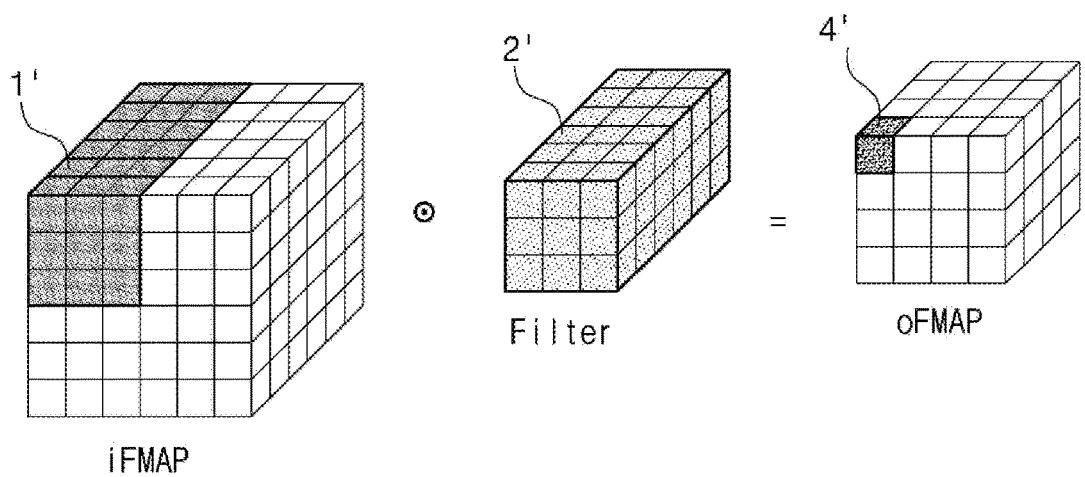
FIG. 3 is a block diagram showing a binarized neural network (BNN) device according to an exemplary embodiment of the present disclosure.

FIG. 3 is a block diagram showing a binarized neural network (BNN) device 20 according to an exemplary embodiment of the present disclosure. FIG. 3 shows the BNN device 20 as an example of the artificial neural network device. Referring to FIG. 3, the BNN device 20 includes an operation part 21 and a classification part 22.

The operation part 21 extracts the features from the input data. For instance, the operation part 21 receives the input feature map iFMAP from the outside and extracts the features from the input feature map iFMAP to output the output feature map oFMAP. In this case, the input feature map iFMAP may be the image, but it should not be limited thereto or thereby. For example, the input feature map iMAP may be the variety of data, such as the image, the audio, and the language.

The classification part 22 receives the output feature map oFMAP from the operation part 21 and performs a classification operation based on the received output feature map oFMAP. For example, in a case where the input feature map iFMAP is the image, the classification part 22 performs the classification operation to determine a field to which the image belongs based on the received output feature map oFMAP. The classification part 22 may include, for example, the fully-connected layer, the softmax function, the dropout layer and the like.

In the exemplary embodiment of the present inventive concept, the operation part 21 supports the BNN operation. In the present embodiment, the BNN operation means that the input feature map and the filter are directly calculated.

Different from the convolutional layer 11 shown in FIG. 1, the operation part 21 according to the exemplary embodiment of the present disclosure does not need to perform the addition operation after performing the multiplication operation, and thus an operation amount decreases compared with the convolutional layer 11 of FIG. 1.

Figure 4:
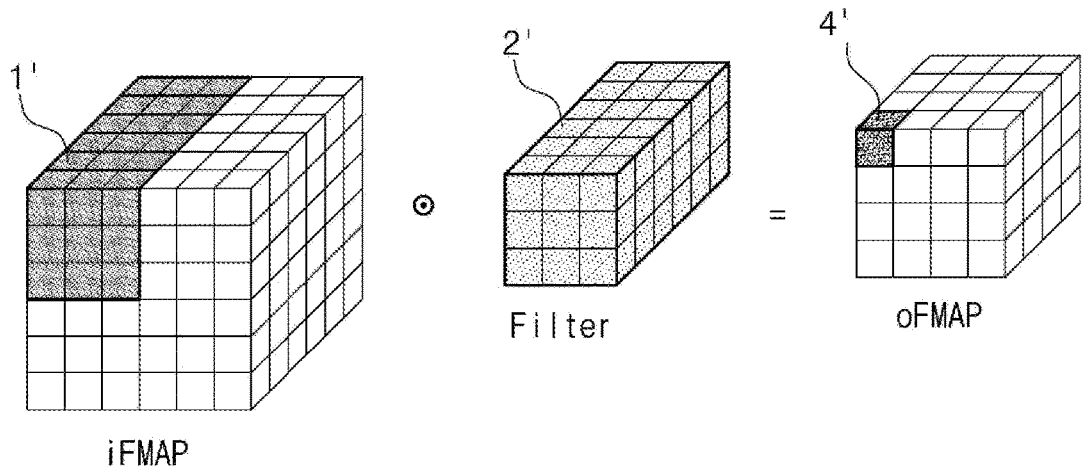
FIG. 4 is a conceptual view showing a BNN operation of the BNN device of FIG. 3.

FIG. 4 is a conceptual view showing the BNN operation of the operation part 21 of the BNN device 20 of FIG. 3. For the convenience of explanation, FIG. 4 shows an example of a process of calculating one data 4' among the data of the output feature map oFMAP. In addition, it is assumed that the depth of the channel is "6" as shown in FIG. 2.

Different from the CNN operation of FIG. 2, the BNN operation of FIG. 4 directly calculates the input feature map iFMAP and the filter. In other words, different from the CNN operation that performs the addition operation on the calculated partial sums pSUMs after calculating the partial sum pSUM for each channel, the BNN operation of FIG. 4 directly calculates the input feature map iFMAP and the filter.

Accordingly, the operation amount of the BNN operation according to the exemplary embodiment of the present disclosure decreases compared with the CNN operation, and the memory used to store the partial sums pSUMs is not necessary. As a result, the BNN device 20 is advantageous for miniaturization.

Figure 5:
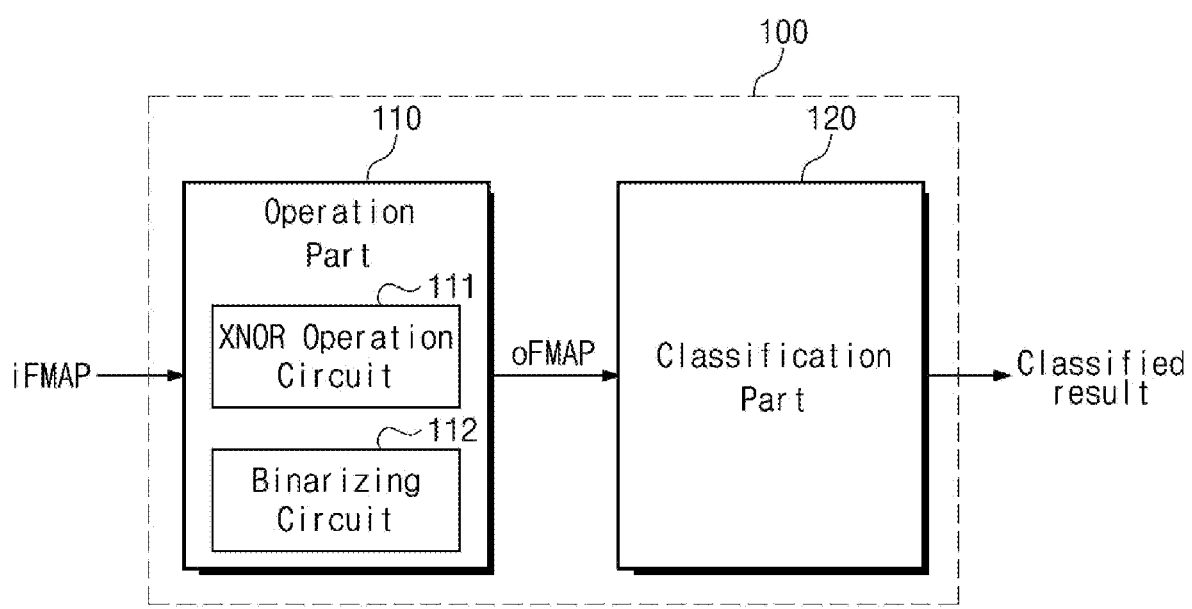
FIG. 5 is a block diagram illustrating the BNN device of FIG. 3 implemented in hardware in more detail.

FIG. 5 is a block diagram illustrating the BNN device 20 of FIG. 3 implemented in hardware in more detail. Referring to FIG. 5, a BNN device 100 includes an operation part 110 and a classification part 120. The operation part 110 includes an exclusive NOR (hereinafter, referred to "XNOR") operation circuit 111 and a binarizing circuit 112.

The XNOR operation circuit 111 receives the input feature map iFMAP from the outside. The XNOR operation circuit 111 performs an XNOR operation on the received input feature map iFMAP. In this case, the XNOR operation means to compare the data of the input feature map iFMAP with the data of the filter corresponding to the data of the input feature map iFMAP and to determine whether the data of the input feature map iFMAP and the data of the filter are the same each other.

Figure 6:
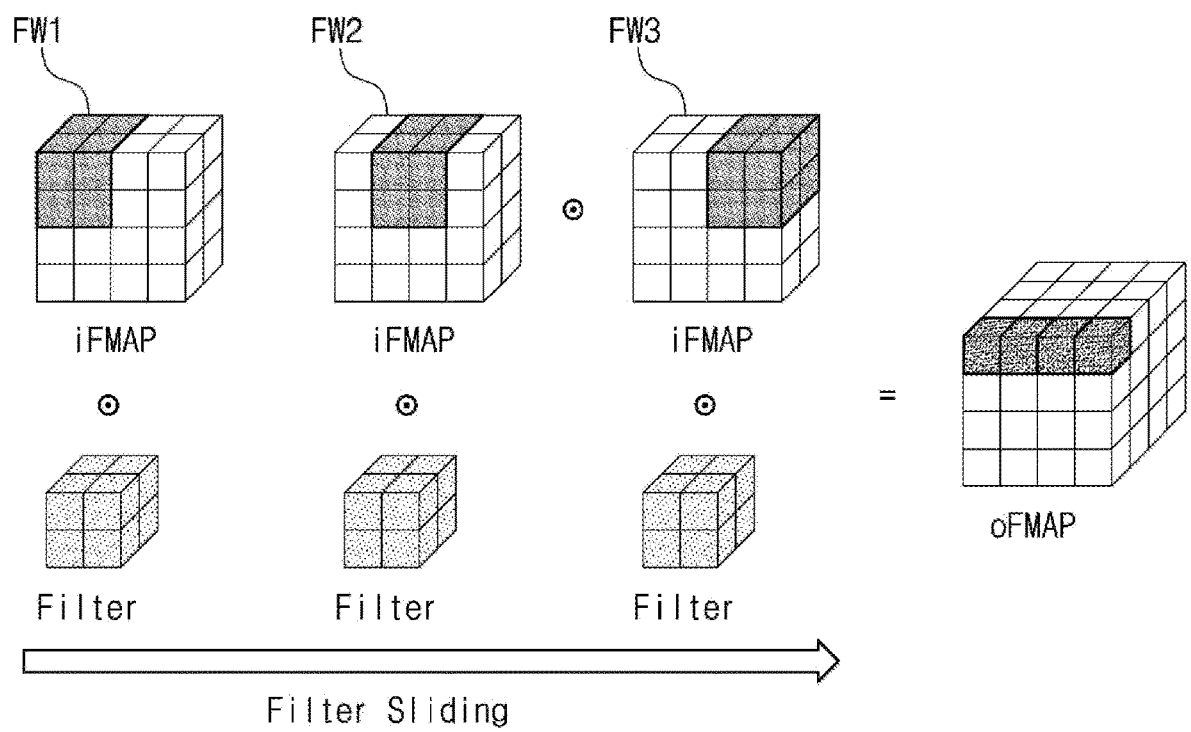
FIG. 6 is a view showing an example of the BNN operation performed while a filter slides to right.
Figure 7A:
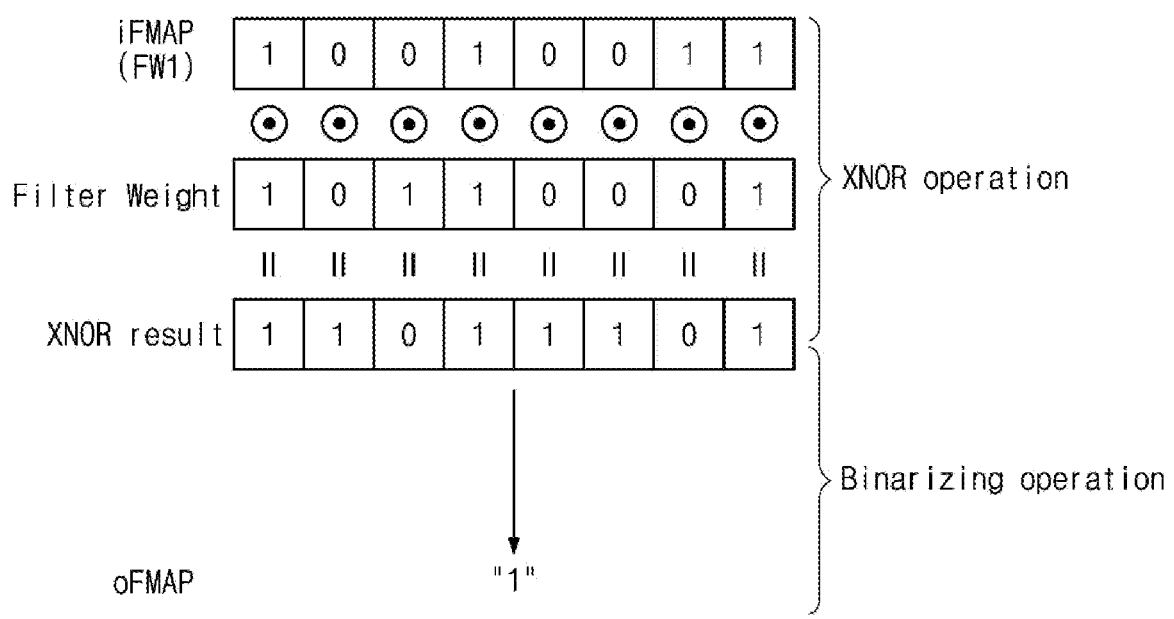
FIGS. 7A and 7B are views showing BNN operation results.
Figure 7B:
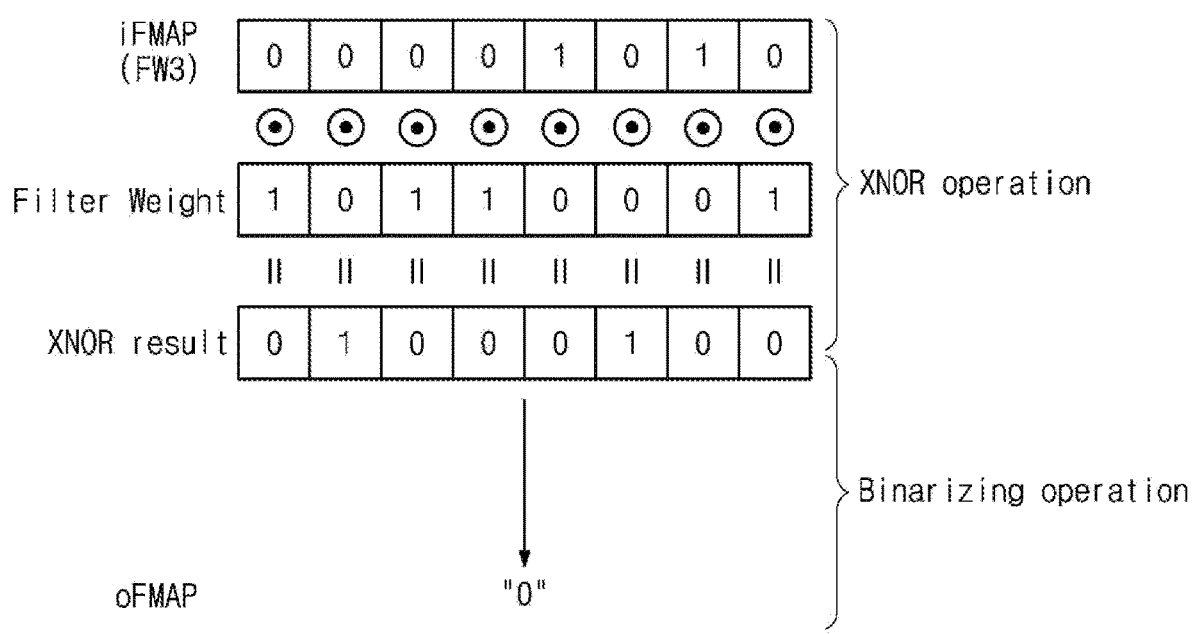

When the BNN operation is performed, multiple XNOR operations may be involved in one BNN operation. For example, when assuming that the filter has a size of 2×2×2 and the input feature map has a size of 4×4×2, eight XNOR operations are required to perform one BNN operation as shown in FIGS. 6, 7A, and 7B.

In the exemplary embodiment according to the present inventive concept, the XNOR operation circuit 111 may be implemented to allow the multiple XNOR operations involved in one BNN operation to be substantially simultaneously performed. That is, the XNOR operation circuit 111 according to the exemplary embodiment of the present disclosure may be implemented in hardware to support a parallel XNOR operation. A configuration and an operation of the XNOR circuit 111 supporting the parallel XNOR operation will be described in detail later.

The binarizing circuit 112 receives the XNOR operation result from the XNOR operation circuit 111. The binarizing circuit 112 performs a binarization operation based on the XNOR operation result and outputs the binarized result as the output feature map oFMAP. In the present exemplary embodiment, the binarization operation means to determine whether the number of times the data of the input feature map iFMAP and filter weight data are matched is greater than the number of times the data of the input feature map iFMAP and the filter weight data are mismatched, or vice versa based on the XNOR operation results and to output the determined result as a binary number of "1" or "0".

When it is determined whether the number of matches is greater than the number of mismatches or vice versa, the binarizing circuit 112 according to the exemplary embodiment of the present disclosure does not count the multiple XNOR operation results one by one. For instance, when assuming that the XNOR operation result is [1, 1, 0, 1, 1, 1, 0, 1] as shown in FIG. 7A, the binarizing circuit 112 does not count the number of ones (1s) or zeros (0s) one by one.

Instead of counting the number of ones (1s) or zeros (0s) one by one, the binarizing circuit 112 according to the exemplary embodiment of the present disclosure compares a discharge rate of a match line on which the XNOR operation is performed with a discharge rate of a reference match line to perform the determination operation about whether the number of matches is greater than the number of mismatches, or vice versa at one time. A configuration and an operation of the binarizing circuit 112 according to the exemplary embodiment of the present disclosure will be described in detail later.

In the exemplary embodiment according to the present disclosure, the BNN device 100 may be an intelligent semiconductor hardware-wise. That is, the BNN device 100 may be implemented by a processor in memory (PIM) among intelligent semiconductors. For example, the BNN device 100 implemented by the processor in memory (PIM) may include a time domain signal processor (TDSP) and a content addressable memory (CAM). In this case, the time domain signal processor (TDSP) may correspond to the binarizing circuit 112, and the content addressable memory (CAM) may correspond to a memory cell array 111_2 of FIG. 8.

That is, the BNN device 100 implemented by the processor in memory (PIM) may perform a binary convolution operation and a majority voting operation on the input feature map iFMAP through the time domain signal processor (TDSP) and the content addressable memory (CAM) to output the output feature map.

In more detail, the time domain signal processor (TDSP) may perform the binary convolution operation on the input feature map iFMAP, and the content addressable memory (CAM) may perform the majority voting operation on the result performed through the time domain signal processor (TDSP).

In the exemplary embodiment, the binary convolution operation may correspond to the XNOR operation and an operation of summing the XNOR operation results calculated through the XNOR operation into a data string as shown in FIGS. 7A and 7B. For example, the binary convolution may correspond to a bit-level XNOR and its cumulative operation. In addition, the majority voting operation may correspond to a binarizing operation that outputs the XNOR operation results in a binary number of "1" or "0" according to the number of matches (i.e., "matching") and the number of mismatches (i.e., "mismatching") based on the XNOR operation results as shown in FIGS. 7A and 7B.

In more detail, the operation of receiving the input feature map in the binary neural network (BNN) may correspond to a write operation performed through the content addressable memory (CAM). In addition, the binary convolution operation of the binary neural network (BNN) may correspond to a search operation of the content addressable memory (CAM). The operation of outputting the output feature map in the binary neural network (BNN) may correspond to the majority voting operation performed by the time domain signal processor TDSP after receiving the result of the search operation of the content addressable memory (CAM).

Figure 8:
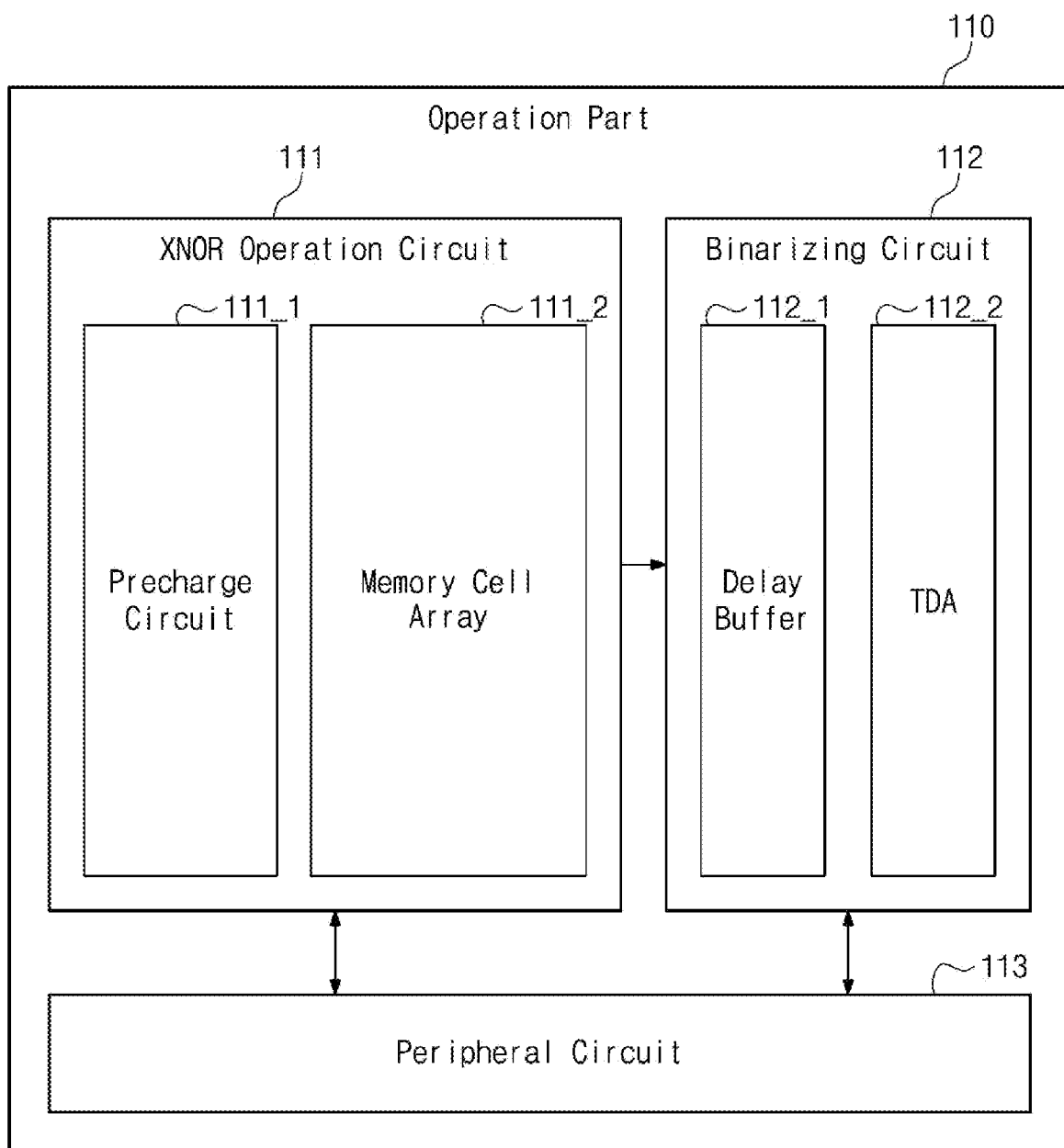
FIG. 8 is a block diagram showing an operation part of FIG. 6 in detail.

That is, the BNN device 100 implemented by the processor in memory (PIM) may store the data using the binarizing circuit 112 and the memory cell array 111_2 of FIG. 8 and substantially simultaneously may perform the binary convolution operation and the majority voting operation, which are used in the binary neural network (BNN). Accordingly, the BNN device 100 implemented by the processor in memory (PIM) may be implemented as the intelligent semiconductor that store and compute operations in hardware.

FIGS. 6, 7A, and 7B are views illustrating the operation of the operation part 110 shown in FIG. 5. In detail, FIG. 6 is a view showing an example of the BNN operation performed while the filter slides to right. FIG. 7A is a view showing the BNN operation result when the number of matches (i.e., "matching") is larger in the XNOR operation result, and FIG. 7B is a view showing the BNN operation result when the number of mismatches (i.e., "mismatching") is larger in the XNOR operation result.

For the convenience of explanation, as shown in FIG. 6, it is assumed that the input feature map iFMAP has the size of 4×4×2 and the filter has the size of 2×2×2. In addition, it is assumed that the BNN operation is performed on a first filter window FW1 to a third filter window FW3 among the input feature map iFMAP while the filter slides to right.

Referring to FIG. 6, the BNN operation is performed on the first filter window FW1 among the input feature map iFMAP. In this case, when data of the first filter window FW1 and filter weight data, which correspond to the data of the first filter window FW1, are the same each other, "1" is output as the XNOR operation result. On the contrary, when data of the first filter window FW1 and filter weight data, which correspond to the data of the first filter window FW1, are different from each other, "0" is output as the XNOR operation result.

After completing the BNN operation with respect to the first filter window FW1, the filter slides to the right, and the BNN operation is sequentially performed on the second and third filter windows FW2 and FW3.

Referring to FIG. 7A, it is assumed that the first filter window FW1 has a data stream of [1, 0, 0, 1, 0, 0, 1, 1] and the filter has a filter weight data stream of [1, 0, 1, 1, 0, 0, 0, 1] when the BNN operation is performed on the first filter window FW1. In this case, the XNOR operation circuit 111 (refer to FIG. 5) performs the XNOR operation and outputs the data stream of [1, 1, 0, 1, 1, 1, 0, 1] as the XNOR operation result. Then, the binarizing circuit 112 (refer to FIG. 5) outputs "1" as the data of the output feature map oFMAP since the data of "1" as the XNOR operation result are relatively large (i.e., the number of matches is relatively large).

Referring to FIG. 7B, it is assumed that the third filter window FW3 has a data stream of [0, 0, 0, 0, 1, 0, 1, 0] and the filter has a filter weight data stream of [1, 0, 1, 1, 0, 0, 0, 1]. In this case, the XNOR operation circuit 111 outputs the data stream of [0, 1, 0, 0, 0, 1, 0, 0] as the XNOR operation result. Then, the binarizing circuit 112 outputs "0" as the data of the output feature map oFMAP since the data of "0" as the XNOR operation result are relatively large (i.e., the number of mismatches is relatively large).

Figure 9:
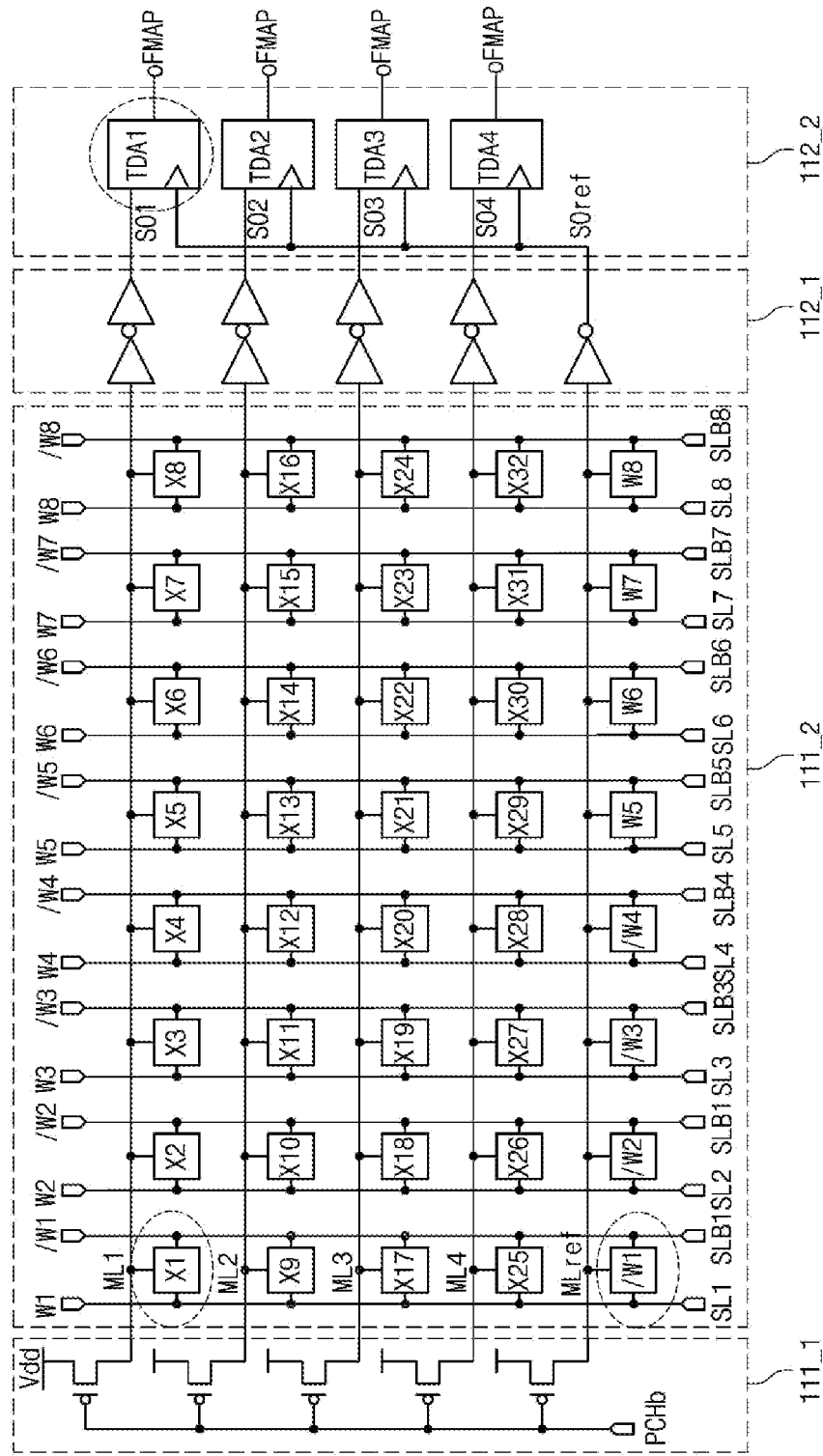
FIG. 9 is a circuit diagram showing an XNOR operation circuit and a binarizing circuit of FIG. 8 in detail.
Figure 10:
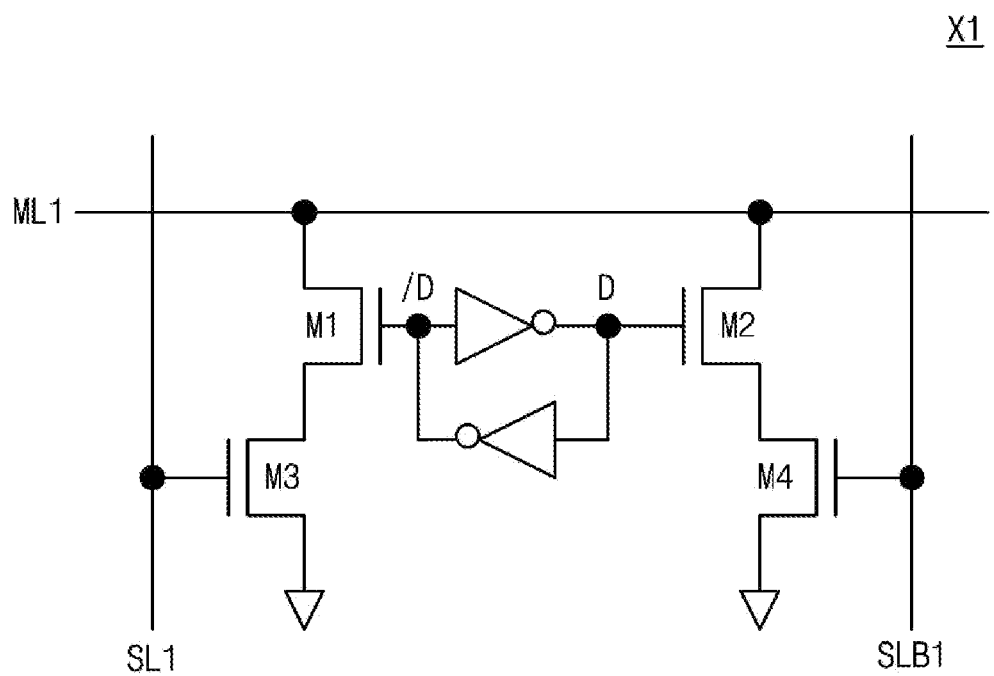
FIG. 10 is a circuit diagram showing an example of a memory cell of FIG. 9.
Figure 11:
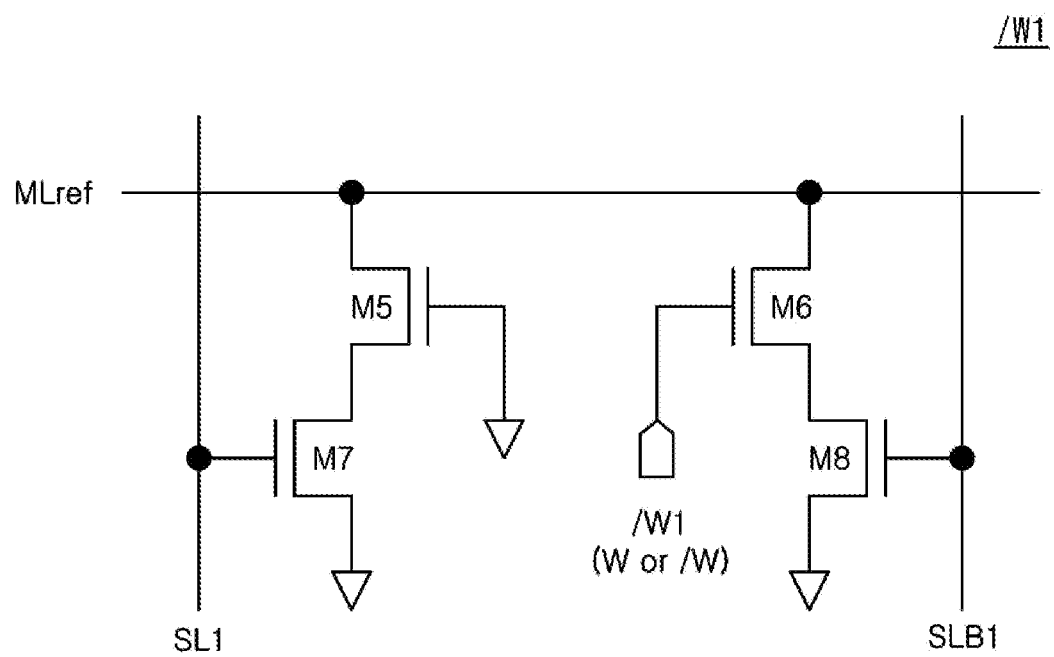
FIG. 11 is a circuit diagram showing an example of a reference memory cell of FIG. 9.
Figure 12:
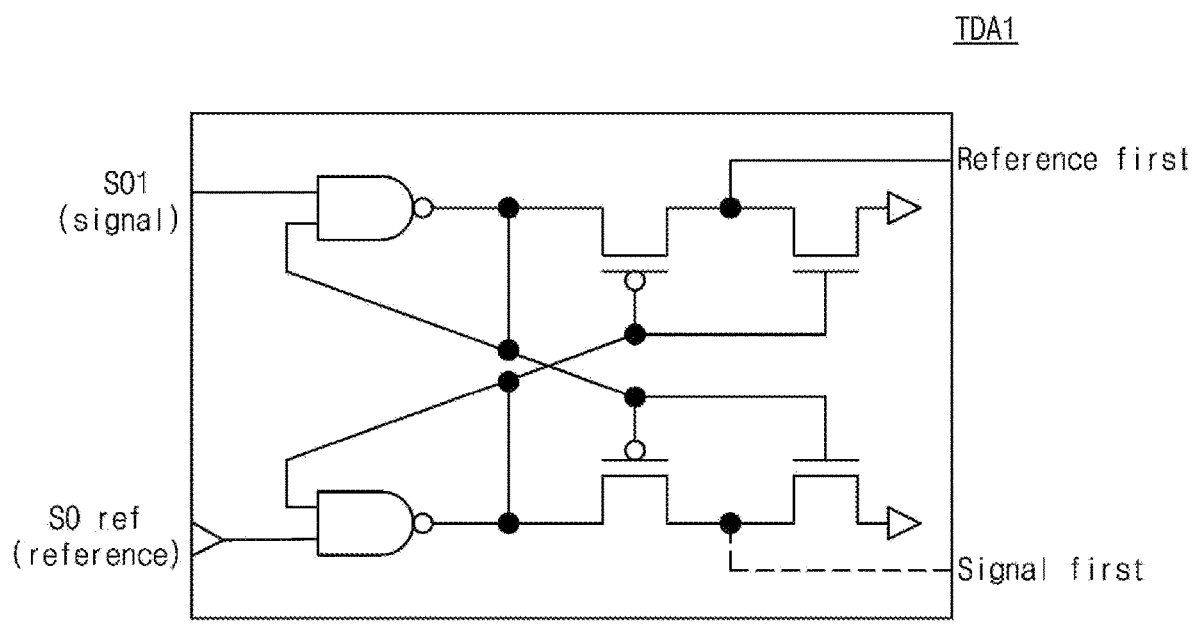
FIG. 12 is a circuit diagram showing an example of a first TDA of FIG. 9.

FIGS. 8 to 12 are views illustrating the operation part 110 of FIG. 6 in detail. In detail, FIG. 8 is a block diagram showing the operation part 110 of FIG. 6 in detail, FIG. 9 is a circuit diagram showing the XNOR operation circuit 111 and the binarizing circuit 112 of FIG. 8 in detail, FIG. 10 is a circuit diagram showing an example of a memory cell X1 of FIG. 9, FIG. 11 is a circuit diagram showing an example of a reference memory cell /W1 of FIG. 9, and FIG. 12 is a circuit diagram showing an example of a first topology data analysis (hereinafter, referred to as "TDA") TDA1 of FIG. 9.

Referring to FIG. 8, the operation part 110 includes the XNOR operation circuit 111, the binarizing circuit 112, and a peripheral circuit 113. In addition, the XNOR operation circuit 111 includes a precharge circuit 111_1 and a memory cell array 111_2, and the binarizing circuit 112 includes a delay buffer 112_1 and a TDA 112_2.

The precharge circuit 111_1 precharges the match line ML. For instance, as shown in FIG. 9, the precharge circuit 111_1 may be implemented by PMOS transistors, and the PMOS transistors may be respectively connected to first to fourth match lines ML1 to ML4 and the reference match line MLref. When the XNOR operation is performed, the precharge circuit 111_1 may precharge the first to fourth match lines ML1 to ML4 and the reference match line MLref to a voltage level Vdd in response to a signal PCHb.

The memory cell array 111_2 includes a plurality of memory cells. For example, as shown in FIG. 9, the memory cell array 111_2 may be implemented to include first to thirty-second memory cells X1 to X32. However, the number of the memory cells should not be limited thereto or thereby, and the number of the memory cells may be changed in various ways depending on a designer.

Each of the memory cells is implemented to store data. For instance, as shown in FIG. 10, the first memory cell X1 may be implemented by four NMOS transistors M1, M2, M3, and M4 and two inverters. As an example, first and third NMOS transistors M1 and M3 are connected to each other in series, and second and fourth NMOS transistors M2 and M4 are connected to each other in series.

In addition, a first source line SL1 may be connected to a gate of the third NMOS transistor M3, and a first complementary source line SLB1 may be connected to a gate of the fourth NMOS transistor M4. The first match line ML1 may be connected to drains of the first and second NMOS transistors M1 and M2. In the present disclosure, the source line is merely exemplary. The source line may be called a search line, however, there is no restriction on the name.

One match line corresponds to the plural memory cells. For example, as shown in FIG. 9, one match line may correspond to eight memory cells. However, the number of the memory cells corresponding to one match line should not be limited to eight. That is, the number of the memory cells corresponding to one match line may be changed in various ways depending on the designer.

In addition, the memory cell array 111_2 further includes a plurality of reference cells. For example, as shown in FIG. 9, the memory cell array 111_2 may include eight reference cells /W1 to /W4 and W5 to W8 connected to the reference match line MLref. However, this is merely exemplary, and the number of the reference cells connected to the reference match line MLref may be changed in various ways depending on the designer.

Each of the reference cells is implemented to discharge the reference match line MLref. For example, as shown in FIG. 11, a first reference cell may be implemented by four NMOS transistors M5, M6, M7, and M8. In this case, fifth and seventh NMOS transistors M5 and M7 are connected to each other in series, and sixth and eighth NMOS transistors M6 and M8 are connected to each other in series.

In addition, the first source line SL1 may be connected to a gate of the seventh NMOS transistor M7, and the first complementary source line SLB1 may be connected to a gate of the eighth NMOS transistor M8. The reference match line MLref may be connected to drains of the fifth and sixth NMOS transistors M5 and M6.

In the case where the BNN operation is performed, some reference cells among the reference cells according to the exemplary embodiment of the present inventive concept may be controlled to discharge the reference match line MLref, and some reference cells among the reference cells according to the exemplary embodiment of the present inventive concept may be controlled not to discharge the reference match line MLref. In particular, in the exemplary embodiment of the present inventive concept, a discharge rate of the reference match line MLref may be controlled to be faster than a discharge rate of the match line in which the number of matches is relatively large and to be slower than a discharge rate of the match line in which the number of the mismatches is relatively large.

For instance, the filter weight data or a complementary value thereof may be selectively provided to a gate of the sixth NMOS transistor M6 of each reference cell. In this case, as shown in FIG. 9, complementary values /W1 to /W4 of first to fourth weight data may be respectively provided to the first to fourth reference cells /W1 to /W4, and fifth to eight weight data W5 to W8 may be respectively provided to the fifth to eight reference cells W5 to W8.

As described above, the discharge rate of the reference match line MLref connected to the reference cells may be controlled by varying the data value provided to the gate of the sixth NMOS transistor M6 of the reference cells. For example, the discharge rate of the reference match line MLref may be controlled to be halfway between the discharge rate of the match line in which the number of matches is relatively large and the discharge rate of the match line in which the number of mismatches is relatively large.

Referring to FIGS. 8 and 9 again, the delay buffer 112_1 of the binarizing circuit 112 is connected to the match line ML and the reference match line MLref and transmits signals provided from the match line ML and the reference match line MLref to the TDA 112_2.

The TDA 112_2 receives the signals of the match line ML and the signal of the reference match line MLref through the delay buffer 112_1. For example, as shown in FIG. 9, the TDA 112_2 includes first to fourth TDAs TDA1 to TDA4, and the first to fourth TDAs TDA1 to TDA4 are respectively connected to the first to fourth match lines ML1 to ML4. In addition, the first to fourth TDAs TDA1 to TDA4 may be connected to the reference match line MLref.

The TDA 112_2 may be implemented to compare the signals of the match line ML with the signal of the reference match line MLref and to output the compared result as the data of the output feature map oFMAP.

For instance, as shown in FIG. 12, the first TDA TDA1 receives the signal of the first match line ML1 through a first sensing node SO1 and the signal of the reference match line MLref through a reference sensing node SOref. The first TDA TDA1 may be implemented to output one of the data of "1" or "0" based on the compared result of the discharge rate of the first match line ML1 and the discharge rate of the reference match line MLref. However, the configuration of the TDA shown in FIG. 12 is merely exemplary, and the configuration of the TDA may be changed in various ways depending on the designer.

FIGS. 13A to 13D are views illustrating the XNOR operation of the XNOR operation circuit 111 of FIGS. 8 and 9 in detail.

For the convenience of explanation, it is assumed that the first and n-th memory cells X1 and Xn connected to the first match line ML1 store the data of "0". In other words, it is assumed that some data among the data of the input feature map iFMAP on which the BNN operation is performed are loaded into the first and n-th memory cells X1 and Xn and the data of the corresponding input feature map is "0".

Figure 13A:
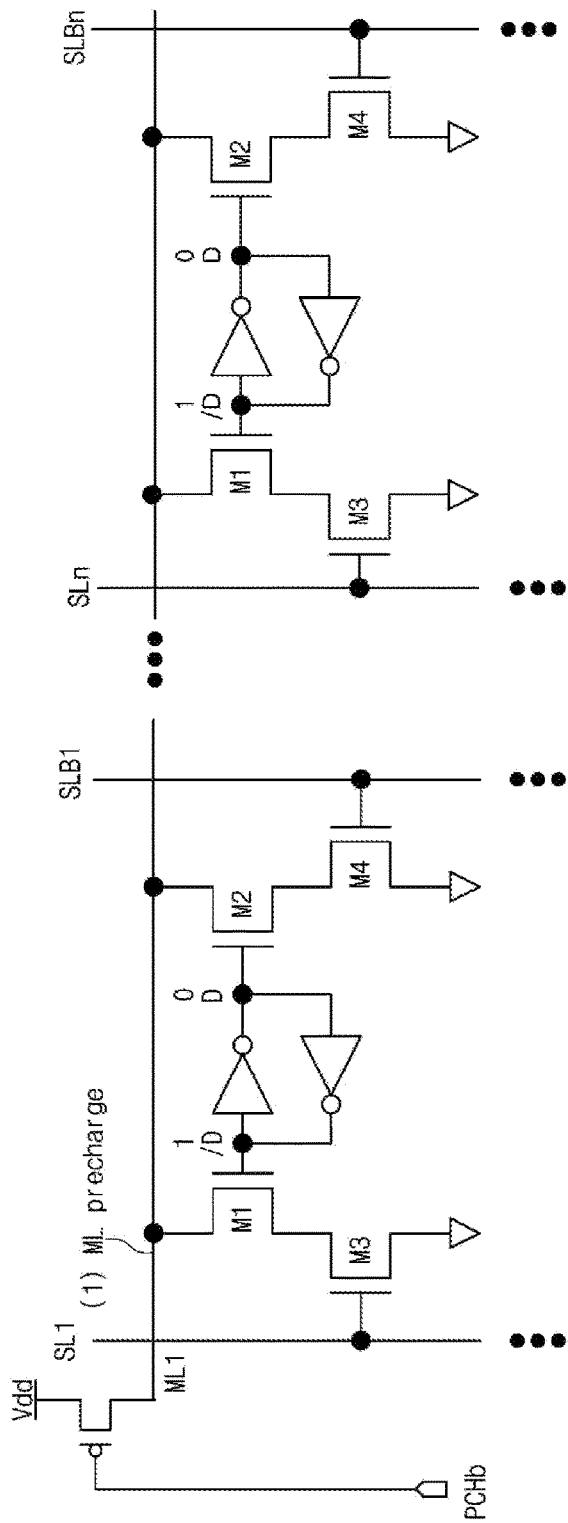
FIGS. 13A to 13D are views illustrating an XNOR operation of an XNOR operation circuit of FIGS. 8 and 9 in detail.

Referring to FIG. 13A, the first match line ML1 is precharged. That is, the first match line ML1 is precharged to the voltage level Vdd by the precharge circuit 111_1 (refer to FIGS. 8 and 9).

Figure 13B:
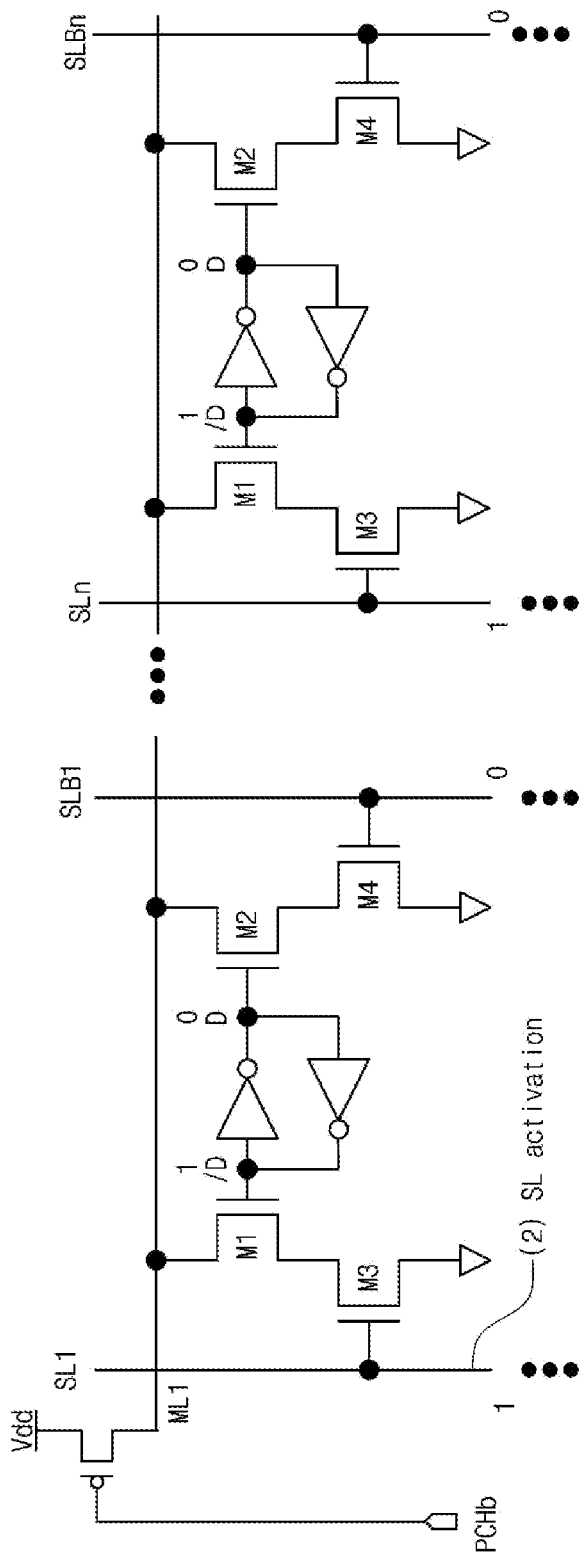

Referring to FIG. 13B, the filter weight data are provided to the source line and the complementary source line. For example, when assuming that the filter weight data provided to the first to n-th source lines SL1 to SLn are "1", a logic high voltage H corresponding to the data of "1" may be applied to the first source line SL1 to the n-th source line SLn as shown in FIG. 13B. In addition, a logic low voltage L corresponding to the data of "o" may be applied to the first complementary source line SLB1 to the n-th complementary source line SLBn.

Figure 13C:
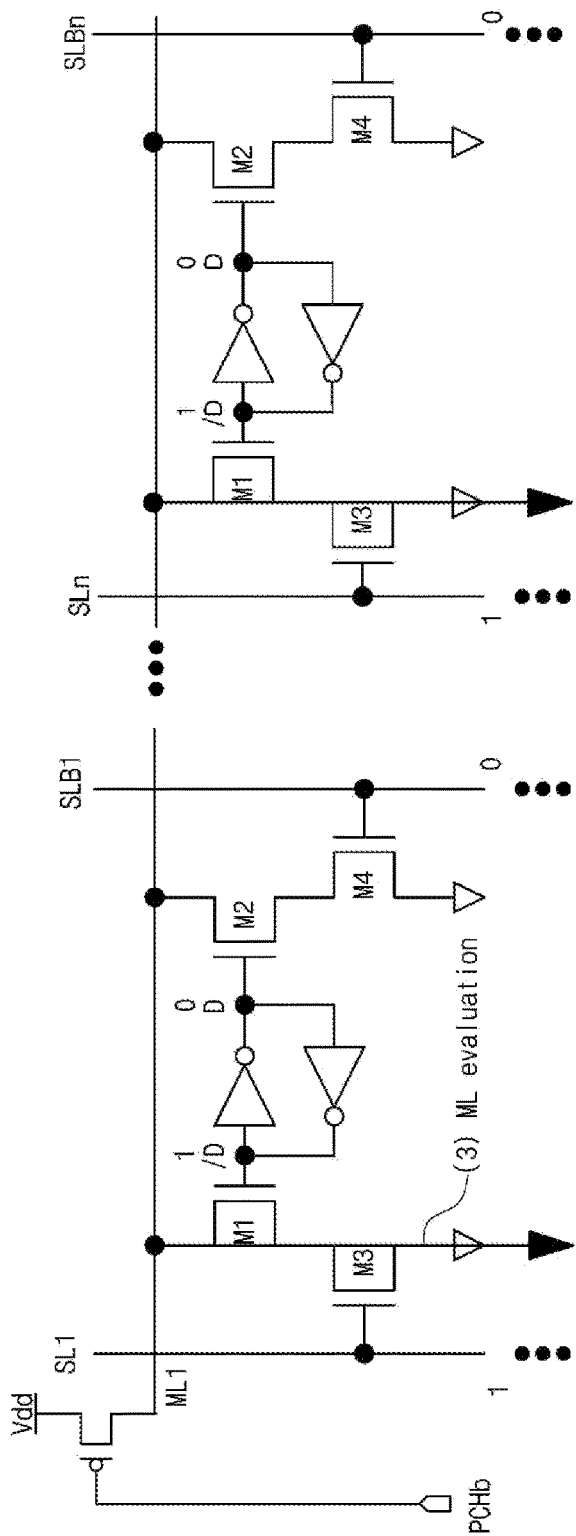

Referring to FIG. 13C, an evaluation operation is performed on the first match line ML1. That is, a discharge path with respect to the first match line ML1 is generated or blocked by turning on or off the memory cells connected to the first match line ML1.

For instance, as shown in FIG. 13C, in the case where the filter weight data provided to the first to n-th source lines SL1 to SLn are "1", the third NMOS transistor M3 of the first memory cell X1 is turned on. In addition, since the data stored in the first memory cell X1 are "1", the first NMOS transistor M1 is turned on. Accordingly, the discharge path is generated by the first and third NMOS transistors M1 and M3 of the first memory cell X1, and the first match line ML1 is discharged.

Similarly, since the data stored in the n-th memory cell Xn are "1", the discharge path may be generated by the first and third NMOS transistors M1 and M3 of the n-th memory cell Xn. As described above, since the discharge path is generated when the data stored in the memory cells and the filter weight data are not the same as each other (i.e., in the case of "mismatching"), the first match line ML1 may be quickly discharged.

Figure 13D:
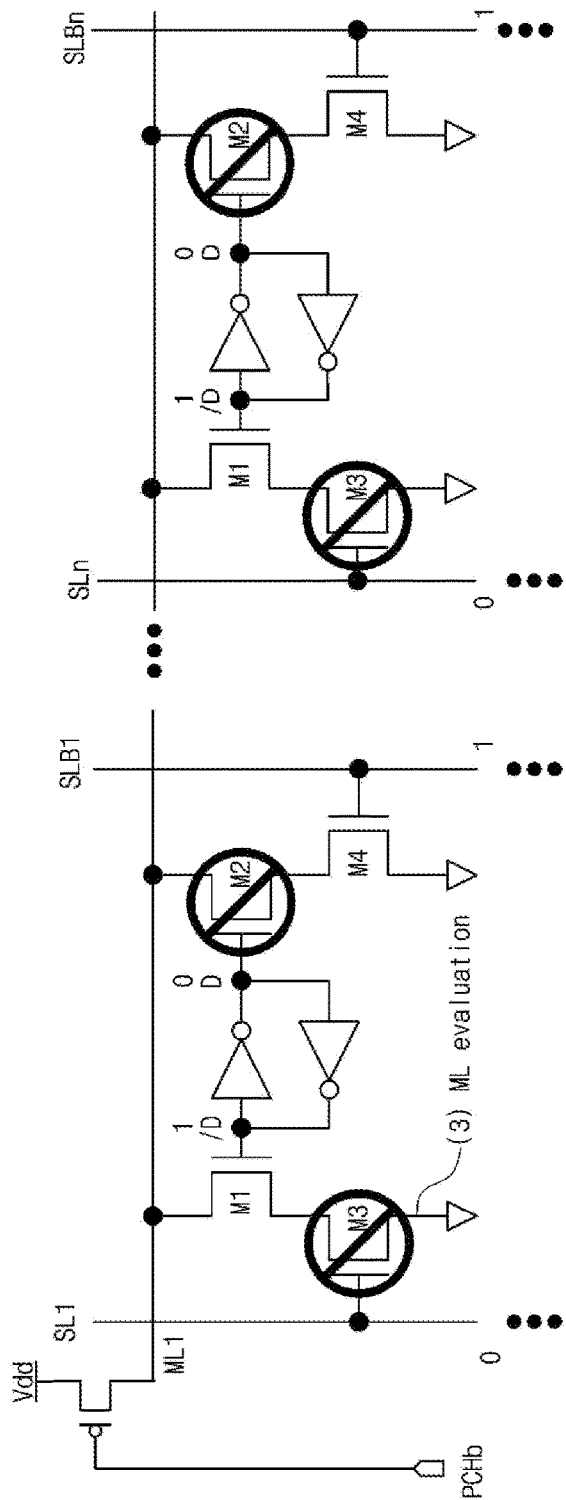

On the contrary, in the case where the data provided through the source line SL are "0", the discharge path may be blocked. For example, as shown in FIG. 13D, when assuming that the data provided to the first to n-th source lines SL1 to SLn are "0", the third NMOS transistor M3 of the first memory cell X1 is turned off. In addition, since the data of "0" are stored in the first memory cell X1, the second NMOS M2 is turned off. Accordingly, the discharge path with respect to the first match line ML1 is blocked.

Similarly, since the data stored in the n-th memory cell Xn are "0", the discharge path may be blocked by the n-th memory cell Xn. As described above, since the discharge path is blocked when the data stored in the memory cells and the filter weight data are the same as each other (i.e., in the case of "matching"), the first match line ML1 may not be discharged or may be slowly discharged.

Figure 14A:
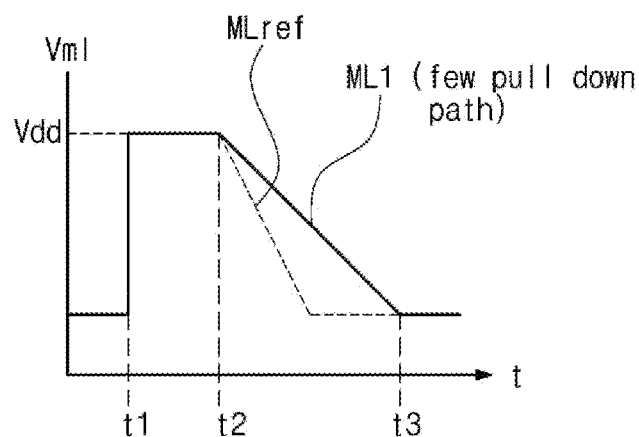
FIGS. 14A to 14C are views showing an example where data of an input feature map and data of a filter weight are matched with each other and an example where the data of the input feature map and the data of the filter weight are mismatched with each other.
Figure 14B:
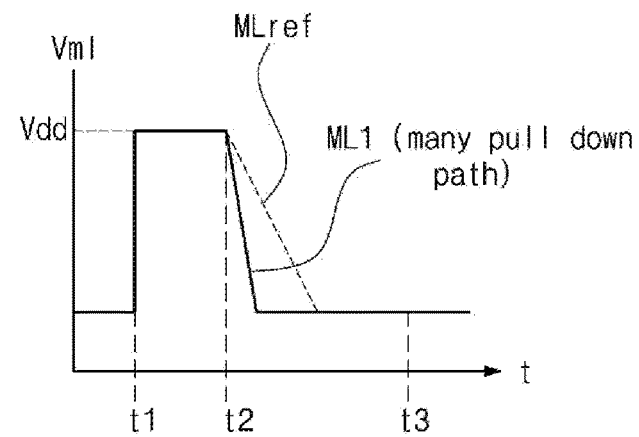
Figure 14C:
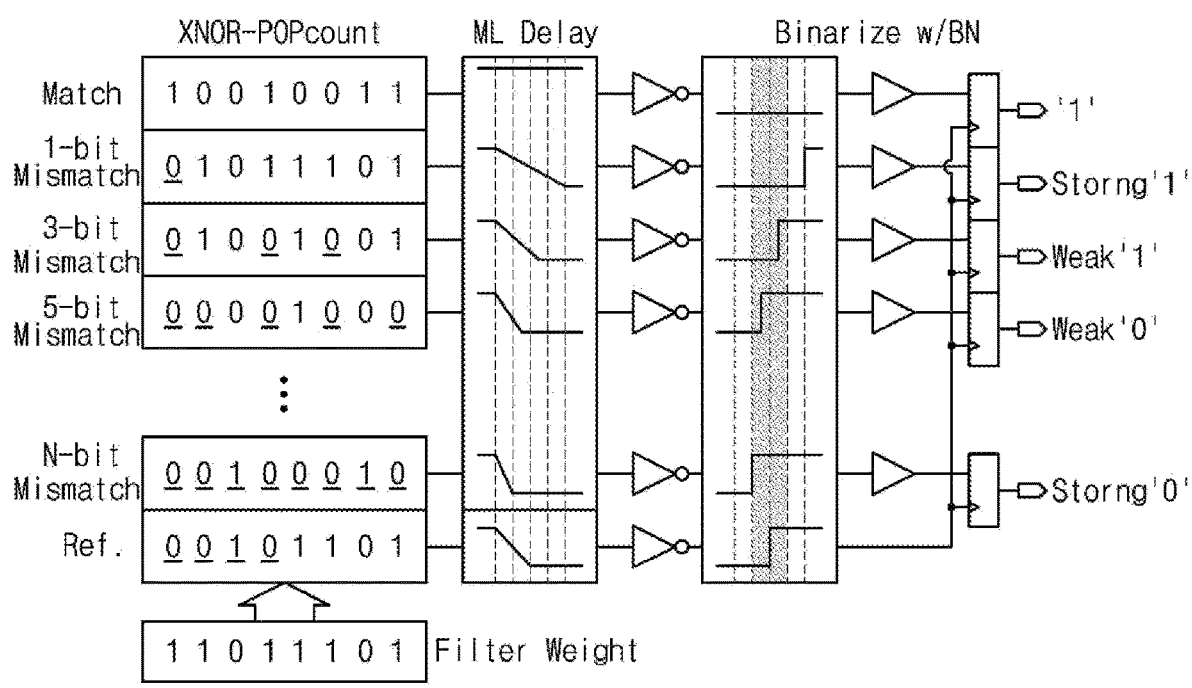

FIGS. 14A to 14C are views illustrating the binarization operation of the binarizing circuit 112 of FIGS. 8 and 9. In detail, FIG. 14A is a view showing an example when the number of matches ("matching") in which the data of the input feature map and the filter weight data are matched with each other is relatively large. FIG. 14B is a view showing an example when the number of mismatches ("mismatching") in which the data of the input feature map and the filter weight data are mismatched with each other is relatively large. FIG. 14C is a view showing a difference in discharge rate according to the number of matches ("matching") and the binarization operation.

Referring to FIG. 14A, it is assumed that the data stream of the input feature map iFMAP is [1, 0, 0, 1, 0, 0, 1, 1] and the data stream of the filter weight is [1, 0, 1, 1, 0, 0, 0, 1]. In addition, it is assumed that the first match line ML1 is precharged to the voltage level Vdd at a first time point t1 and the data stream of the filter weight is provided to the memory cells connected to the first match line ML1 through the source line SL at a second time point t2.

In this case, the number of times (i.e., the number of matches) where the data of the input feature map and the filter weight data corresponding to the data of the input feature map are the same each other is larger than the number of times (i.e., the number of mismatches) where the data of the input feature map and the filter weight data are different from each other. Accordingly, as described with reference to FIG. 13D, among the memory cells connected to the same match line, the number of the memory cells that block the discharge path becomes larger than the number of the memory cells that generate the discharge path.

Accordingly, in the case where there are relatively many "matches", the corresponding match line is discharged slower than the reference match line. In this case, the reference match line MLref provided to the first TDA TDA1 is transited to a logic low L faster than the first match line ML1, and thus the first TDA TDA1 may output "1" as the data of the output feature map.

Referring to FIG. 14B, it is assumed that the data stream of the input feature map iFMAP is [0, 0, 0, 0, 1, 0, 1, 0] and the data stream of the filter weight is [1, 0, 1, 1, 0, 0, 0, 1]. In addition, it is assumed that the first match line ML1 is precharged to the voltage level Vdd at the first time point t1 and the data stream of the filter weight is provided to the memory cells connected to the first match line ML1 through the source line SL at the second time point t2.

In this case, the number of mismatches where the data of the input feature map and the filter weight data are mismatched with each other is larger than the number of matches where the data of the input feature map and the filter weight data are matched. Accordingly, the number of the memory cells that generate the discharge path becomes larger than the number of the memory cells that block the discharge path. Accordingly, in the case where there are relatively many "mismatches", the corresponding match line is discharged faster than the reference match line. In this case, the first match line ML1 provided to the first TDA TDA1 is transited to a logic low L faster than the reference match line MLref, and thus the first TDA TDA1 may output the "0" as the data of the output feature map.

Referring to FIG. 14C, the binarization operation according to the number of "mismatches" is shown. As described above, the discharge path is generated in the case of the "mismatching". Accordingly, when the data stream of the input feature map are totally matched with the data stream of the filter weight, the discharge path is not generated, and in this case, the TDA 112_2 outputs "1" as the data of the output feature map.

In addition, when the number of "matches" is larger than the number of "mismatches", the corresponding match line is discharged slower than the reference match line, and in this case, the TDA 112_2 outputs "1" as the data of the output feature map.

However, when the "mismatches" are larger than the "matches", the corresponding match line is discharged faster than the reference match line, and in this case, the TDA 112_2 outputs "0" as the data of the output feature map.

Figure 15:
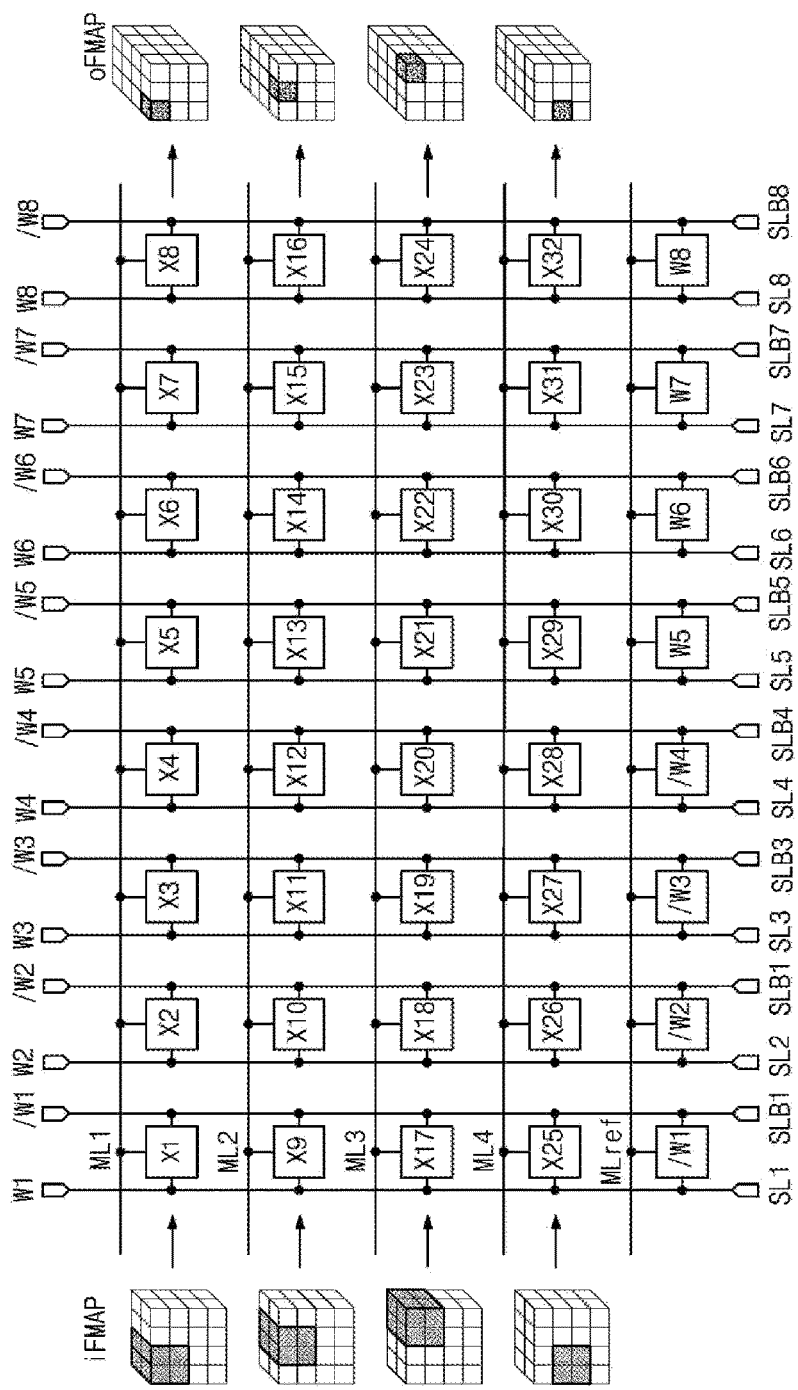
FIG. 15 is a view showing an example of a BNN operation of a BNN device according to an exemplary embodiment of the present disclosure.

FIG. 15 is a view showing an example of the BNN operation of the BNN device 100 according to an exemplary embodiment of the present disclosure. As an example, FIG. 15 shows an example of the BNN operation performed while the filter slides to right.

In the exemplary embodiment of the present inventive concept, BNN operations may be performed on different filter weights from each other in parallel.

Referring to FIG. 15, the data stream of the first filter window FW1 of the input feature map iFMAP may be stored in the memory cells X1 to X8 of the first match line ML1. The data stream of the second filter window FW2 among the input feature map iFMAP may be stored in memory cells X9 to X16 of the second match line ML2. Similarly, the data stream of the third filter window FW3 and the data stream of the fourth filter window FW4 may be respectively stored in the memory cells of the third and fourth match lines ML3 and ML4.

Then, the first to fourth match lines ML1 to ML4 are precharged, and the data stream of the filter weight may be provided through the source line SL.

In this case, discharge operations may be substantially simultaneously performed on the first to fourth match lines ML1 to ML4, and the operation for comparing the discharge rate of the first to fourth match lines ML1 to ML4 with the discharge rate of the reference match line may be simultaneously performed.

Consequently, the BNN device 100 according to the exemplary embodiment of the present disclosure may perform the BNN operations on the first to fourth filter windows FW1 to FW4 in parallel, and thus the BNN operation may be performed more quickly than before.

Meanwhile, the above descriptions are merely exemplary, and the present inventive concept should not be limited thereto or thereby. For example, in FIG. 15, the first filter window FW1 and the second filter window FW2 partially overlap with each other, and thus it has been described that the data of the filter window are stored in the memory cell array to overlap with each other. However, the BNN device according to the exemplary embodiment of the present inventive concept may be implemented such that the data of the filter window, which do not overlap with each other, are stored in the memory cell array.

Figure 16:
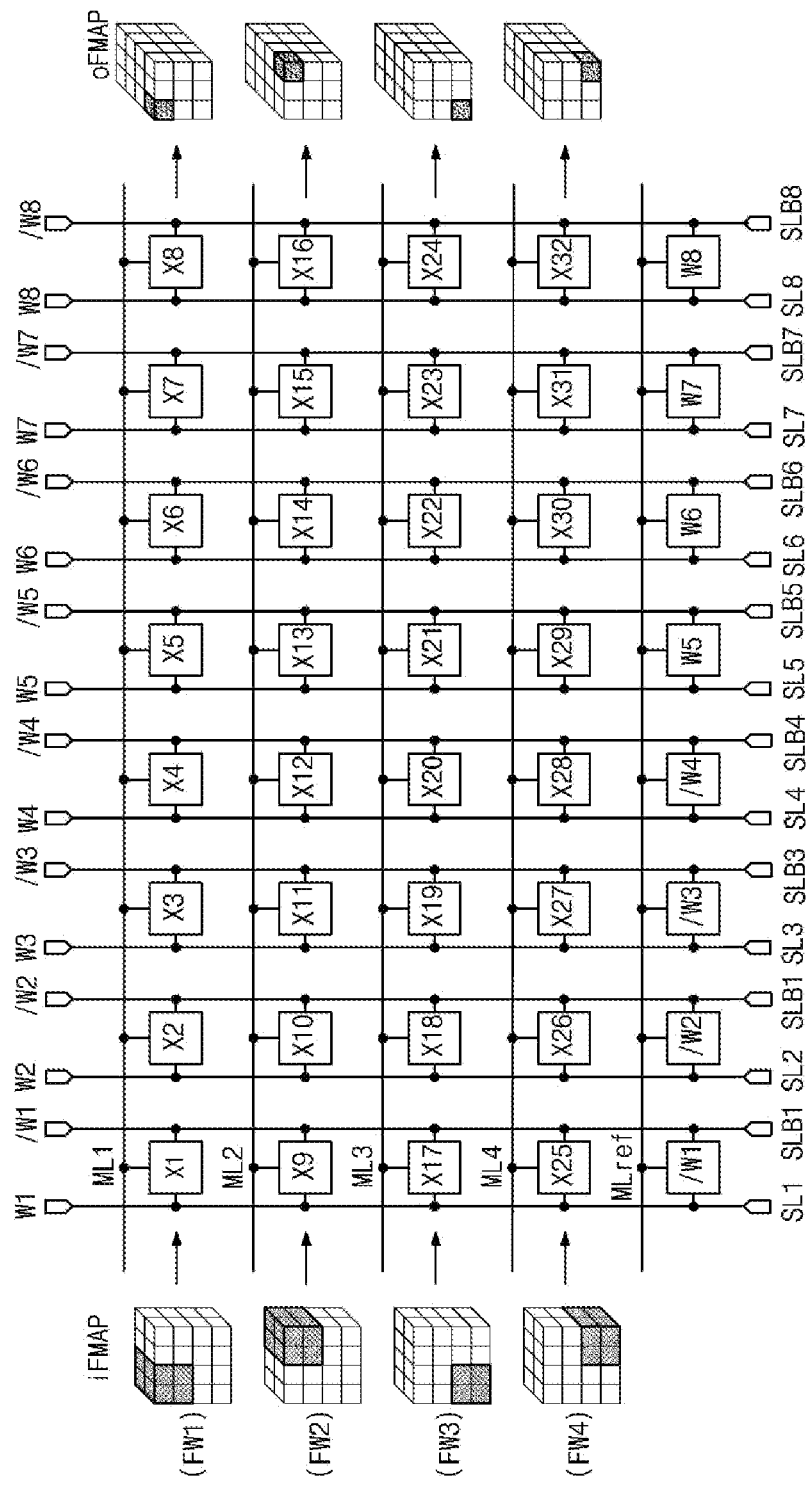
FIG. 16 is a view showing another example of a BNN operation of a BNN device according to an exemplary embodiment of the present disclosure.

FIG. 16 is a view showing another example of the BNN operation of the BNN device 100 according to an exemplary embodiment of the present disclosure. FIG. 16 shows an example of the filter windows, which do not overlap with each other and stored in the memory cell array.

Referring to FIG. 16, the data streams of the first to fourth filter windows FW1 to FW4 of the input feature map iFMAP may be respectively stored in the memory cells corresponding to the first to fourth match lines ML1 to ML4. In this case, different from FIG. 15, the first to fourth filter windows FW1 to FW4 may be set not to overlap with each other.

In the case where the filter windows are set not to overlap with each other, the data stored in the memory cell array do not overlap with each other. Accordingly, more data of the input feature map may be stored in the memory cell array. In addition, similar to FIG. 15, since the BNN operations may be performed on the first to fourth filter windows FW1 to FW4 in parallel, the BNN operation may be performed quickly.

Figure 17:
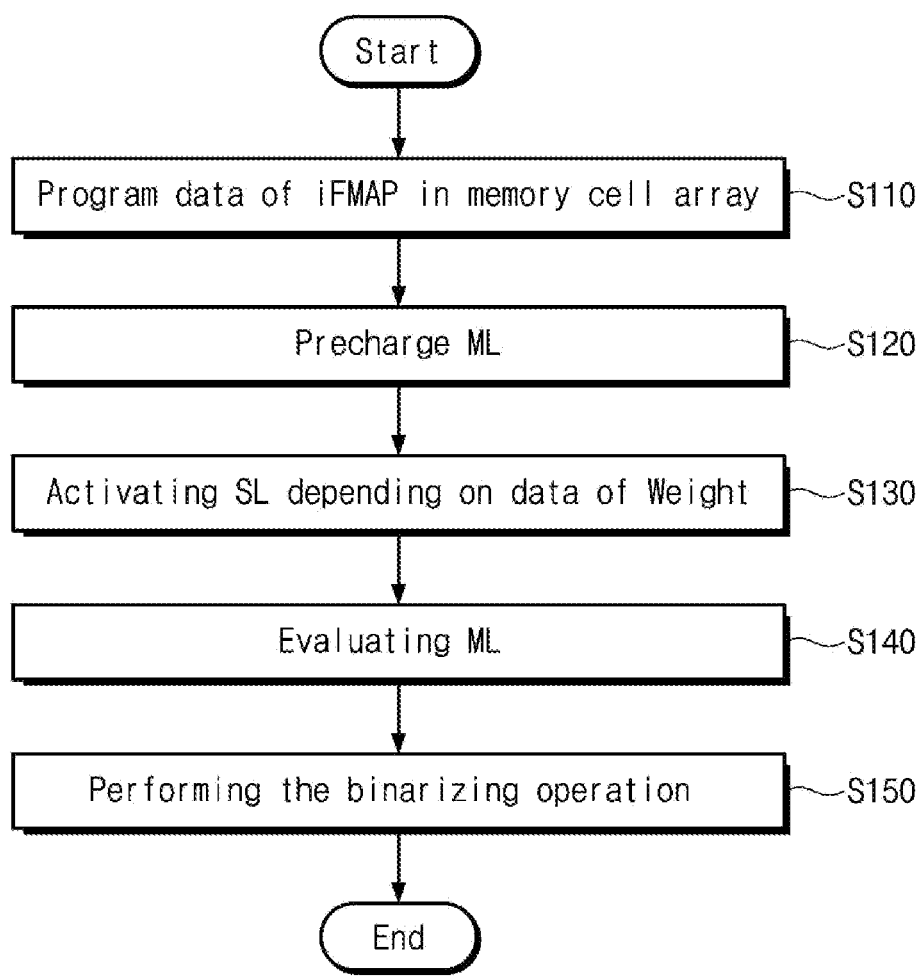
FIG. 17 is a flowchart illustrating an operation of the BNN device according to an exemplary embodiment of the present disclosure.

FIG. 17 is a flowchart illustrating the operation of the BNN device according to an exemplary embodiment of the present disclosure.

In operation S110, the data of the input feature map iFMAP are programmed in the memory cell array. For instance, as described with reference to FIG. 15, some filter windows among the filter windows may overlap with each other, and thus some data may overlap with each other while being stored in the memory cell array. As another example, as described with reference to FIG. 16, the filter windows may not overlap with each other, and thus the data corresponding to the filter windows may be stored in the memory cell array without being overlapped with each other.

In operation S120, the match line ML is precharged. As an example, the match line ML is precharged to the voltage Vdd by the precharge circuit as described in FIG. 13A.

In operation S130, the source line SL is activated based on the filter weight. For example, the data stream of the filter weight may be provided to the source line SL as described in FIG. 13B.

In operation S140, an evaluation operation is performed on the match line ML. In detail, as described in FIG. 13C, the discharge path with respect to the match line ML is generated in accordance with the data provided through the source line SL and the data stored in the memory cell.

As an example, in the case where the data provided through the source line SL are different from the data stored in the memory cell, the discharge path with respect to the match line ML is generated. As another example, in the case where the data provided through the source line SL are the same as the data stored in the memory cell, the discharge path with respect to the match line ML is blocked.

In operation S150, the binarization operation is performed. For instance, as described in FIGS. 14A and 14B, the discharge rate of the match line ML is compared with the discharge rate of the reference match line MLref, and the binarization operation may be performed to output the data of the output feature map.

As an example, in the case where the match line ML is discharged slower than the reference match line MLref, it is determined that the "matching" data where the filter window and the filter weight of the input feature map are matched with each other are relatively large, and thus "1" is output as the data of the output feature map. As another example, in the case where the match line ML is discharged faster than the reference match line MLref, it is determined that the "mismatching" data where the filter window and the filter weight of the input feature map are not matched with each other are relatively large, and thus "0" is output as the data of the output feature map.

As described with reference to FIGS. 8 to 17, the BNN device 100 according to the exemplary embodiment of the present inventive concept provides the circuit that performs the XNOR operation and the binarization operation. In particular, the BNN device 100 according to the exemplary embodiment of the present inventive concept may be implemented to substantially simultaneously perform multiple XNOR operations by storing the data stream of the input feature map in the memory cells connected to the match line ML and providing the data stream of the filter weight through the source line SL.

In addition, the BNN device 100 according to the exemplary embodiment of the present disclosure compares the discharge rate of the match line with the discharge rate of the reference match line to compare the data of the output feature map. Accordingly, the BNN device 100 may be implemented to substantially simultaneously perform the determination of whether the "matches" are large or the "mismatches" are large and the output operation of the data of the output feature map without counting every XNOR operation result.

Meanwhile, the above descriptions are merely exemplary, and it is understood that the present inventive concept should not be limited thereto or thereby. In addition, it is understood that the present inventive concept may be variously applied. Hereinafter, various application examples of the present inventive concept will be described in more detail.

Figure 18:
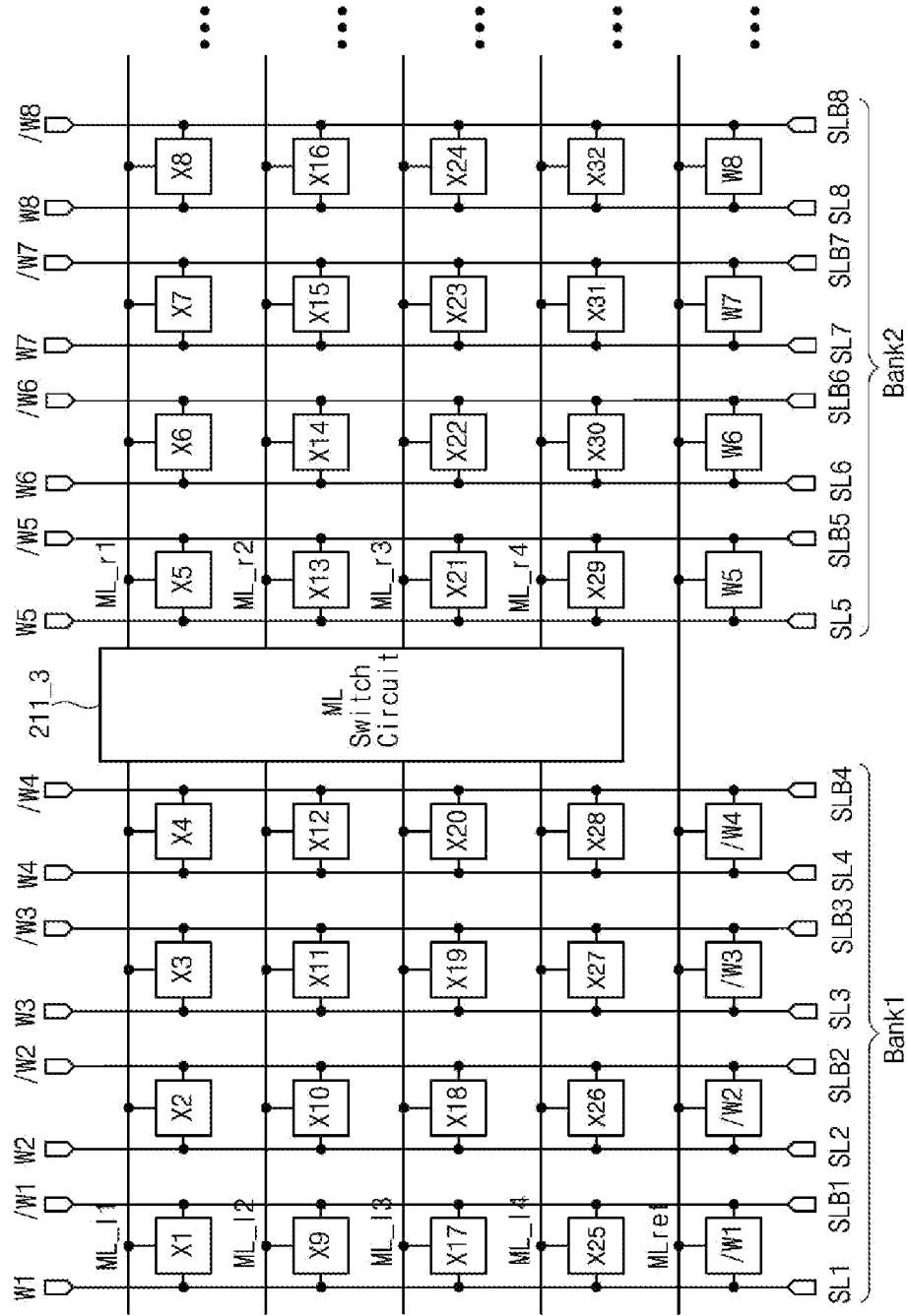
FIG. 18 is a view showing a memory cell array according to another exemplary embodiment of the present disclosure.
Figure 19:
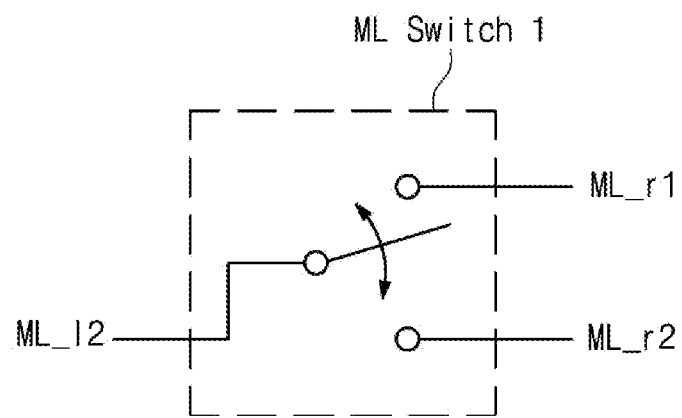
FIG. 19 is a view showing a first match line switch among a plurality of match line switches included in a match line switch circuit of FIG. 18.

FIGS. 18 and 19 are views showing a BNN device 200 according to another exemplary embodiment of the present disclosure. In detail, FIG. 18 is a view showing a memory cell array 211-2 according to another exemplary embodiment of the present disclosure, and FIG. 19 is a view showing a first match line switch ML Switch 1 among a plurality of match line switches included in a match line switch circuit 211_3 of FIG. 18.

The BNN device 200 of FIGS. 18 and 19 is similar to the BNN device 100 of FIGS. 8 to 17. Therefore, the same or similar components are assigned with the same or similar reference numerals, and the same descriptions will be omitted in order to avoid redundancy.

Referring to FIG. 18, the memory cell array 211_2 may include a plurality of banks and the match line switch circuit 211_3 may be disposed between the banks. The match line switch circuit 211_3 includes a plurality of match line switches, and each of the match line switches electrically connects a left match line and a right match line.

For instance, as shown in FIG. 19, the first match line switch ML Switch 1 may be disposed between one left match line ML_l2 and two right match lines ML_r1 and ML_r2 and may connect a second left match line ML_l2 to one of first and second right match lines ML_r1 and ML_r2 in response to an external control signal.

However, this is merely exemplary, and the number of the left match lines and the number of the right match lines, which correspond to the match line switch ML Switch 1 may be variously changed depending on the designer.

In the exemplary embodiment of the present inventive concept, the match line switch circuit 211_3 may perform a switching operation based on a right sliding of the filter. In particular, in a case where the BNN operations are substantially simultaneously performed with respect to the filter windows, which are not overlapped with each other, the match line switch circuit 211_3 according to the present inventive concept may be provided. This will be described in more detail with reference to FIG. 20.

Figure 20A:
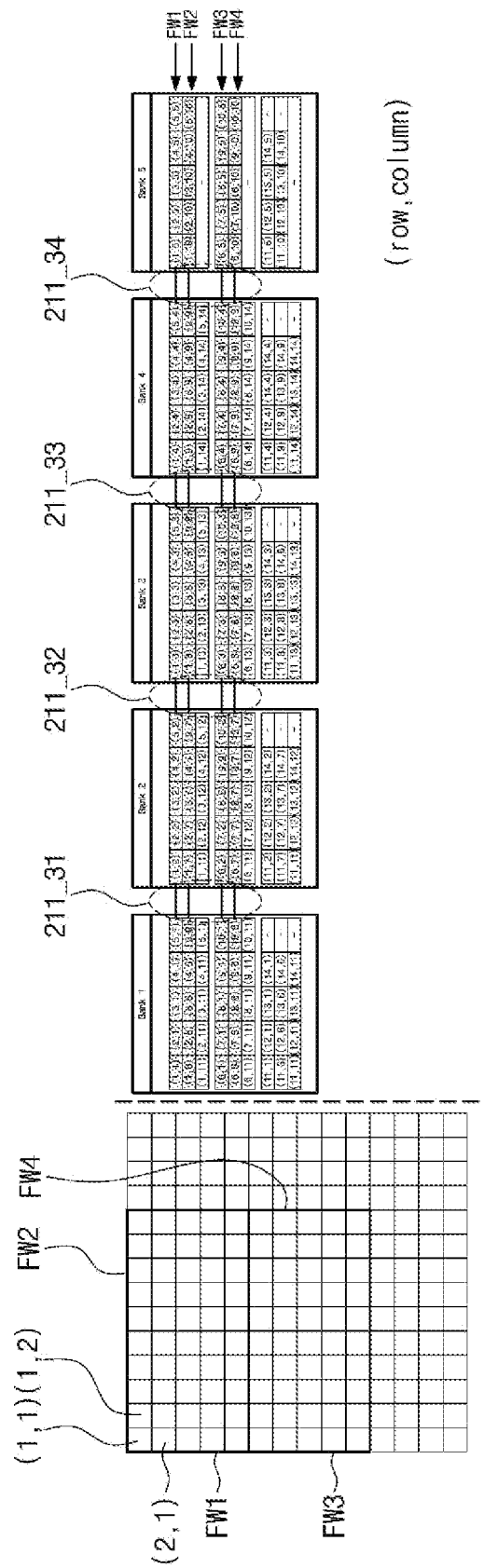
FIGS. 20A-20C and 21 are views illustrating an operation of the match line switch circuit of FIGS. 18 and 19.
Figure 20B:
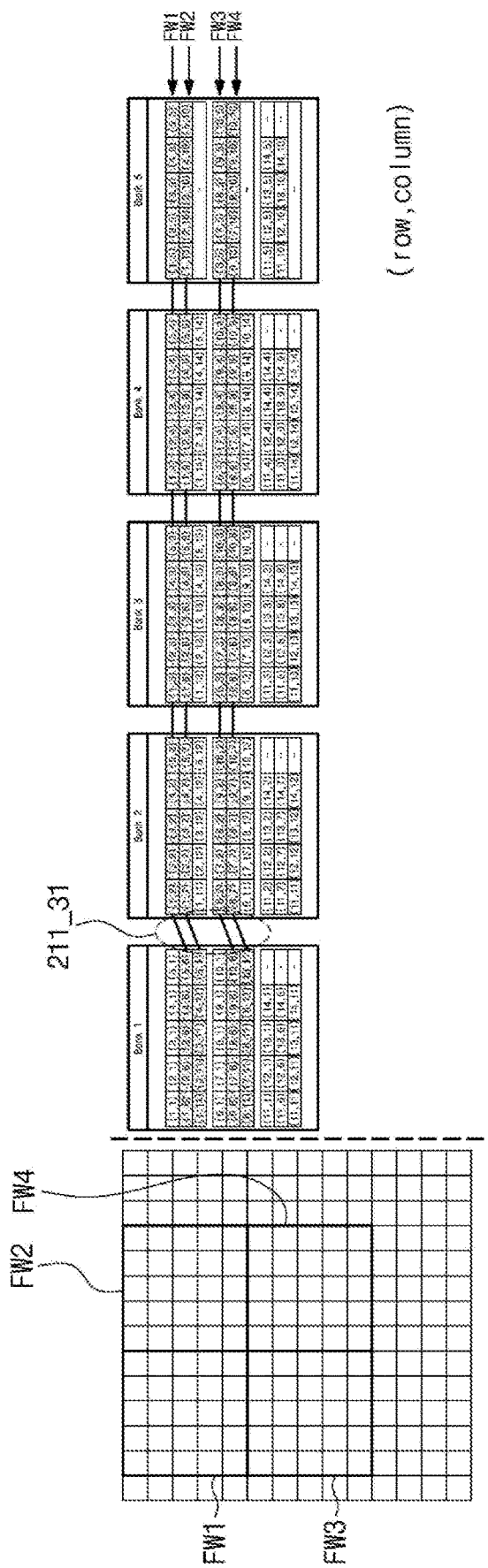
Figure 20C:
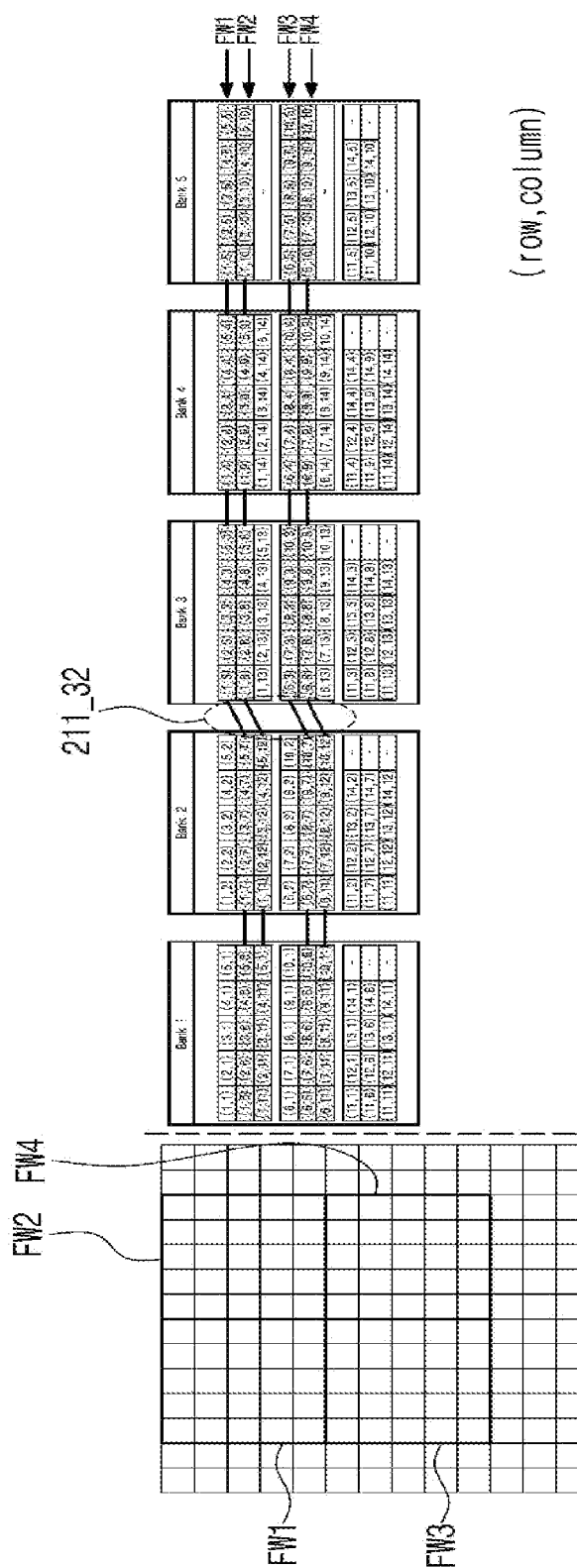
Figure 21:
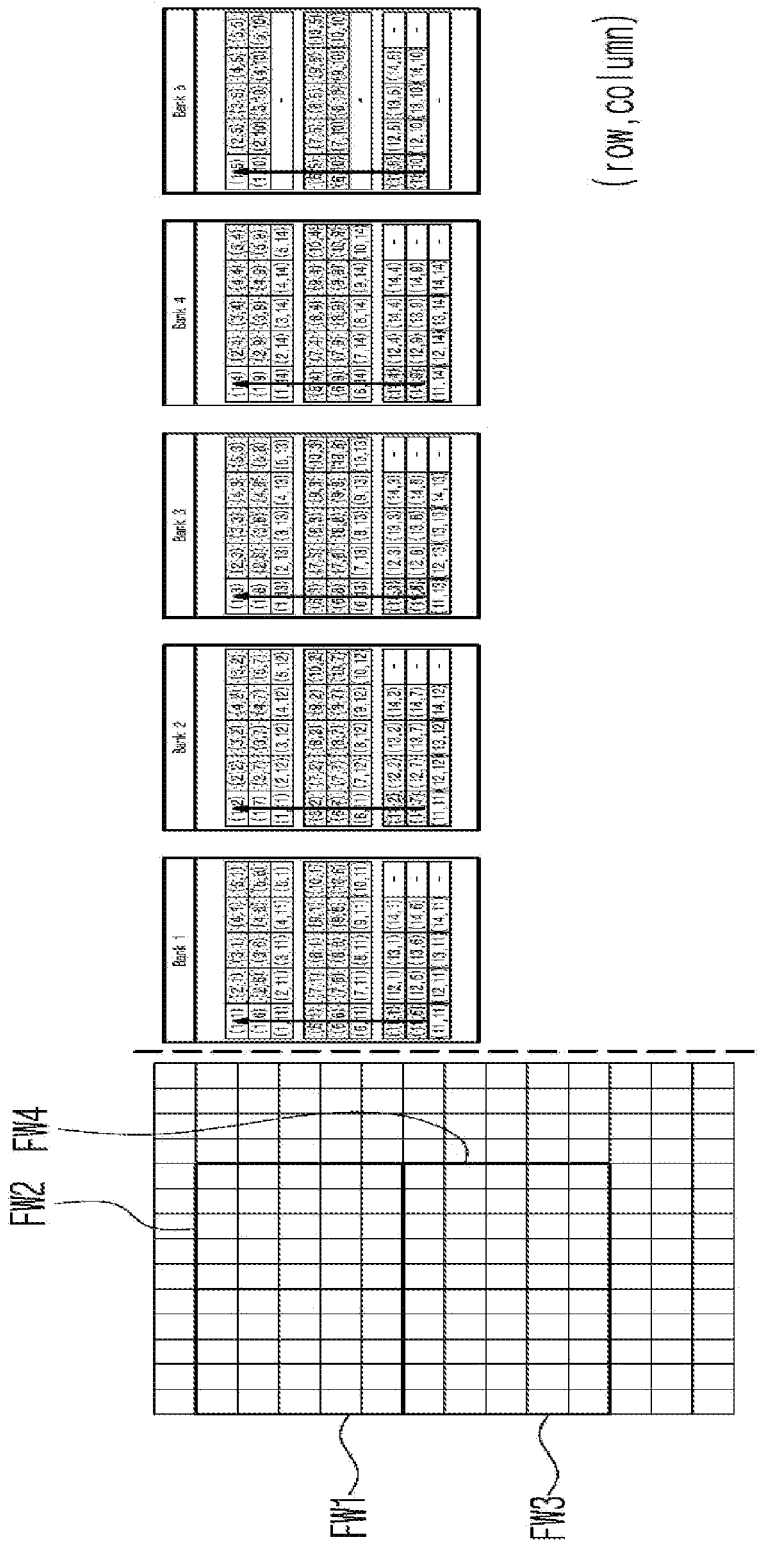

FIGS. 20 and 21 are views illustrating an operation of the match line switch circuit 211_3 of FIGS. 18 and 19.

For the convenience of explanation, it is assumed that the input feature map iFMAP has a size of 14×14 and the filter has a size of 5×5. In addition, it is assumed that the filter window corresponding to the filter has a size of 5×5 and the BNN operations with respect to the first to fourth filter windows FW1 to FW4 are performed in parallel. Further, it is assumed that the filter slides to a right direction and a stride is "1". In addition, it is assumed that the memory cell array includes five banks and first to fourth match line switch circuits 211_31 to 211_34 are disposed between the banks. Coordinates of the input feature map are displayed in rows and columns (row, column).

Referring to FIG. 20A, the data of the input feature map iFMAP are stored in the memory cell array. As an example, data corresponding to the first filter window FW1 are stored in a first row of the first to fifth banks BANK1 to BANK5, and data corresponding to the second filter window FW2 are stored in a second row of the first to fifth banks BANK1 to BANK5. In addition, data corresponding to the third filter window FW3 are stored in a fourth row of the first to fifth banks BANK1 to BANK5, and data corresponding to the fourth filter window FW4 are stored in a fifth row of the first to fifth banks BANK1 to BANK5.

Hereinafter, the first filter window FW1 will be described in detail as a representative example. Data corresponding to a first column (1, 1) to (5, 1) of the first filter window FW1 are stored in the first row of the first bank BANK1, and data corresponding to a second column (1, 2) to (5, 2) of the first filter window FW1 are stored in the first row of the second bank BANK2. In this way, the data of the first filter window FW1 are stored in the first row of the first to fifth banks BANK1 to BANK5.

Referring to FIG. 20A, the BNN operation is performed on the first to fourth filter windows FW1 to FW4. In this case, as described in FIG. 16, the BNN operations may be substantially and simultaneously performed on the first to fourth filter windows FW1 to FW4 in parallel. In addition, since the data of the first to fourth filter windows FW1 to FW4 are located at the same row of the first to fifth banks BANK1 to BANK5, each of the first to fourth match line switches 211_31 to 211_34 connects the left match line and the right match line, which are located at the same row.

Referring to FIG. 20B, the filter slides to the right direction by "1". In this case, the first to fourth filter windows FW1 to FW4 slide to the right direction by the "1", and thus some data of the data corresponding to the first to fourth filter windows FW1 to FW4 are changed.

In more detail, when the filter slides to the right direction by "1", the data of (1, 6) to (5, 6) previously included in the second filter window FW2 are changed to the data of the first filter window FW1. Accordingly, the first match line switch circuit 211_31 performs the switching operation to allow the second left match line ML_l2 of the first bank BANK1 to be connected to the first right match line ML_r1 of the second bank BANK2.

Similarly, the first match line switch circuit 211_31 connects a third left match line ML_l3 of the first bank BANK1 to the second right match line ML_r2 of the second bank BANK2, connects a fifth left match line ML_l5 of the first bank BANK1 to a fourth right match line ML_r4 of the second bank BANK2, and connects a sixth left match line ML_l6 of the first bank BANK1 to a fifth right match line ML_r5 of the second bank BANK2.

Referring to FIG. 20C, the filter further slides to the right direction by "1". In this case, the first to fourth filter windows FW1 to FW4 further slide to the right direction by "1" when compared with FIG. 20B, and thus some data of the data corresponding to the first to fourth filter windows FW1 to FW4 are changed.

In more detail, when the filter further slides to the right direction by "1", the data of (1, 7) to (5, 7) previously included in the second filter window FW2 are changed to the data of the first filter window FW1. Accordingly, the second match line switch circuit 211_32 performs the switching operation to allow the second left match line ML_l2 of the second bank BANK2 to be connected to the first right match line ML_r1 of the third bank BANK3.

Similarly, the second match line switch circuit 211_32 connects the third left match line ML_l3 of the second bank BANK2 to the second right match line ML_r2 of the third bank BANK3, connects the fifth left match line ML_l5 of the second bank BANK2 to the fourth right match line ML_r4 of the third bank BANK3, and connects the sixth left match line ML_l6 of the second bank BANK2 to the fifth right match line ML_r5 of the third bank BANK3.

As described above, the BNN device 200 according to the exemplary embodiment of the present disclosure may perform the BNN operation on the filter windows in parallel in the state where the data of the input feature map are stored in the memory cell without being overlapped with each other. In addition, when the filter slides to the right direction, the BNN operation may be easily performed only by the operation of switching the match line switch 211_3.

Meanwhile, in a case where the filter slides downward, an operation for reprogramming some data among the data stored in the memory cell array. For example, as shown in FIG. 21, it is assumed that the filter slides downward by "1". In this case, data of (2, 1) to (6, 1) correspond to the first column of the first filter window FW1, and thus the data of (2, 1) to (6, 1) are required to be stored in the first row of the first bank BANK1. In this case, since the data of (2, 1) to (5, 1) are already stored in the first bank BANK1, the data corresponding to (7, 1) will be reprogrammed in the first row of the first bank BANK1.

Similar to the above, some data among the data stored in the first to fifth banks BANK1 to BANK5 may be reprogrammed by the sliding of the filter downward.

Although the embodiments of the present disclosure have been described with reference to the accompanying drawings, the present disclosure should not be limited to the above-illustrated embodiments, and various kinds of modifications and variations may be added to the embodiments within the same or equal scope of the present disclosure by one skilled in the art. However, even if the working effect of the invention is not disclosed in the specification, the effect still can be considered in assessing inventiveness if the effect can be inferred from the descriptions in the specification.

What is claimed is:

1. A processor in memory comprising:
   a time domain signal processor; and
   a content addressable memory,
   wherein the processor in memory is configured to perform a binary convolution operation and a majority voting operation on an input feature map through the time domain signal processor and the content addressable memory to output an output feature map, and wherein the time domain signal processor is configured to output data of the output feature map based on a comparison result of discharge rates, and
   wherein the discharge rates comprise a discharge rate of a match line connected to the content addressable memory and a discharge rate of a reference match line.

2. The processor in memory of claim 1, wherein the content addressable memory corresponds to a memory cell array of an artificial neural network device, and the time domain signal processor corresponds to a binarizing circuit of the artificial neural network device.

3. An artificial neural network device comprising:
   an operation part configured to perform an artificial neural network operation on an input feature map; and
   a classification part configured to perform a classifying operation on the input feature map based on the artificial neural network operation of the operation part, the operation part comprising:
   an XNOR operation circuit configured to perform an XNOR operation on the input feature map and a filter; and
   a binarizing circuit configured to perform a binarization operation based on the result of the XNOR operation of the XNOR operation circuit, and output data of the output feature map based on a comparison result of discharge rates,
   wherein the discharge rates comprise a discharge rate of a match line connected to a memory cell array and a discharge rate of a reference match line.

4. The artificial neural network device of claim 3, wherein the XNOR operation circuit comprises:
   the memory cell array comprising a plurality of memory cells connected to a plurality of match lines and storing data of the input feature map; and
   a precharge circuit precharging at least one match line among the match lines.

5. The artificial neural network device of claim 4, wherein the memory cell array is connected to a plurality of source lines and receives weight data of the filter through the source lines.

6. The artificial neural network device of claim 5, wherein at least one memory cell among the memory cells comprises:
   a first transistor connected to a match line selected from the match lines and turned on or off in response to a complementary value of stored data;
   a second transistor connected to the selected match line and turned on or off in response to the stored data;
   a third transistor connected to the first transistor and turned on or off in response to data provided to a source line selected from the source lines; and
   a fourth transistor connected to the second transistor and turned on or off in response to a complementary value of the data provided to the selected source line.

7. The artificial neural network device of claim 6, wherein, when the stored data and the data provided through the selected source line are the same as each other, the at least one memory cell blocks a discharge path with respect to the selected match line, and when the stored data and the data provided through the selected source line are different from each other, the at least one memory cell generates the discharge path with respect to the selected match line.

8. The artificial neural network device of claim 5, wherein the memory cell array further comprises a plurality of reference cells connected to a reference match line to generate or block a discharge path with respect to the reference match line.

9. The artificial neural network device of claim 8, wherein at least one reference cell among the reference cells comprises:
   a first transistor connected to the reference match line to block the discharge path;
   a second transistor connected to the reference match line and turned on or off in response to a weight value of the filter;
   a third transistor connected to the first transistor and turned on or off in response to data provided to a source line selected from the source lines; and
   a fourth transistor connected to the second transistor and turned on or off in response to a complementary value of the data provided to the selected source line.

10. The artificial neural network device of claim 9, wherein, when the artificial neural network operation is performed, some reference cells of the reference cells generate the discharge path with respect to the reference match line, and other reference cells of the reference cells block the discharge path with respect to the reference match line.

11. The artificial neural network device of claim 8, wherein the reference cells do not store data.

12. The artificial neural network device of claim 8, wherein the binarizing circuit comprises:
- a plurality of TDAs (topology data analysis); and
- a delay buffer disposed between the match lines and the TDAs, and each of the TDAs is connected to a corresponding match line among the match lines and commonly connected to the reference match line.

13. The artificial neural network device of claim 12, wherein at least one TDA among the TDAs outputs data of an output feature map based on a comparison result of a discharge rate of the corresponding match line among the match lines and a discharge rate of the reference match line.

14. The artificial neural network device of claim 4, wherein the memory cells comprise:
- a first group of memory cells corresponding to a first match line among the match lines; and
- a second group of memory cells corresponding to a second match line different from the first match line among the match lines, and the data of the input feature map are stored in the first group of memory cells and the second group of memory cells to overlap with each other.

15. The artificial neural network device of claim 14, wherein the artificial neural network operation with respect to the data stored in the first group and the artificial neural network operation with respect to the data stored in the second group are substantially simultaneously performed.

16. The artificial neural network device of claim 4, wherein the memory cells comprise:
- a first group of memory cells corresponding to a first match line among the match lines; and
- a second group of memory cells corresponding to a second match line different from the first match line among the match lines, and the data of the input feature map are stored in the first group of memory cells and the second group of memory cells not to overlap with each other.

17. The artificial neural network device of claim 4, wherein the memory cell array comprises:
- a plurality of banks storing the memory cells; and
- a match line switch circuit disposed between the banks.

18. The artificial neural network device of claim 17, wherein the match line switch circuit selects a match line of a first bank among the banks based on a sliding operation of the filter, selects a match line of a second bank adjacent to the first bank, and electrically connects the selected match line of the first bank to the selected match line of the second bank.

19. A method of operating an artificial neural network device, comprising:
- programming data of an input feature map in a memory cell array;
- precharging at least one match line among a plurality of match lines connected to the memory cell array;
- providing weight data of a filter through at least one source line among a plurality of source lines connected to the memory cell array;
- performing an evaluation operation on the at least one match line based on the data stored in the memory cell array and the weight data of the filter; and
- outputting data of an output feature map based on a comparison result of a discharge rate of the at least one match line and a discharge rate of a reference match line.

* * * * *